United States Patent
Li et al.

(10) Patent No.: US 12,028,256 B2
(45) Date of Patent: Jul. 2, 2024

(54) METHOD AND APPARATUS FOR CONTROLLING TRAFFIC IN PACKET-BASED NETWORK

(71) Applicant: HUAWEI TECHNOLOGIES CO., LTD., GuangDong (CN)

(72) Inventors: Guoping Li, Shenzhen (CN); Tingqiu Yuan, Shenzhen (CN); Boyan Tu, Shenzhen (CN); Tao Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/972,652

(22) Filed: Oct. 25, 2022

(65) Prior Publication Data
US 2023/0037724 A1   Feb. 9, 2023

Related U.S. Application Data

(63) Continuation of application No. 16/993,269, filed on Aug. 14, 2020, now Pat. No. 11,516,134, which is a
(Continued)

(30) Foreign Application Priority Data

Feb. 14, 2018 (CN) .......................... 201810152118.4

(51) Int. Cl.
*H04L 47/10* (2022.01)
*H04L 47/24* (2022.01)
(Continued)

(52) U.S. Cl.
CPC .............. *H04L 47/18* (2013.01); *H04L 47/24* (2013.01); *H04L 47/283* (2013.01); *H04L 47/34* (2013.01)

(58) Field of Classification Search
CPC ....... H04L 47/18; H04L 47/24; H04L 47/283; H04L 47/34
See application file for complete search history.

(56) References Cited

U.S. PATENT DOCUMENTS 7,102,999 B1 * 9/2006 Sindhu .................... H04L 49/30
370/235
7,260,079 B1 * 8/2007 Chapman .............. H04W 28/20
370/335
(Continued)

FOREIGN PATENT DOCUMENTS

| CN | 1868179 A | 11/2006 |
|---|---|---|
| CN | 101345749 A | 1/2009 |

(Continued)

OTHER PUBLICATIONS

R. Bush et al: Some Internet Architectural Guidelines and Philosophy Request for Comments: 3439, Dec. 2002, total 28 pages.

*Primary Examiner* — Chi H Pham
*Assistant Examiner* — Weibin Huang
(74) *Attorney, Agent, or Firm* — Rimon PC

(57) ABSTRACT

This application discloses a method for controlling traffic in a packet-based network. In the method, after receiving a control packet from a transmit end, an intermediate node between the transmit end and the receive end sends a control packet at the head of a first control queue based on a first duration, wherein the first duration is obtained based on a committed burst size (CBS) and a first committed information rate (CIR), and the intermediate node is configured to send a packet of a first transmit end to a first receive end in the packet-based network. After sending the control packet in the control queue, the intermediate node sends a first data packet set at the head of a data queue based on the sent
(Continued)

control packet, wherein the first data packet set comprises C data packets, and C is an integer greater than or equal to 1.

17 Claims, 16 Drawing Sheets

Related U.S. Application Data continuation of application No. PCT/CN2018/124099, filed on Dec. 27, 2018.

(51) Int. Cl.
*H04L 47/283* (2022.01)
*H04L 47/34* (2022.01)

(56) References Cited

U.S. PATENT DOCUMENTS

| | | | |
|---|---|---|---|
| 8,989,167 B2* | 3/2015 | Namm | H04W 76/18 370/341 |
| 10,581,962 B2* | 3/2020 | Cheng | H04L 61/2571 |
| 2007/0165575 A1* | 7/2007 | Niwano | H04W 72/1268 370/335 |
| 2013/0208592 A1 | 8/2013 | Lu et al. | |
| 2014/0098672 A1 | 4/2014 | Zhang | |
| 2015/0381505 A1 | 12/2015 | Sundararaman et al. | |
| 2017/0332279 A1* | 11/2017 | Kobayashi | H04W 24/02 |
| 2018/0145919 A1* | 5/2018 | Kalikot Veetil | H04L 5/001 |
| 2019/0068494 A1* | 2/2019 | Tamizkar | H04L 45/02 |
| 2019/0104207 A1* | 4/2019 | Goel | H04L 45/64 |
| 2019/0132765 A1* | 5/2019 | Cho | H04W 28/0268 |

FOREIGN PATENT DOCUMENTS

| | | |
|---|---|---|
| CN | 100574262 C | 12/2009 |
| CN | 102891803 A | 1/2013 |
| CN | 103888379 A | 6/2014 |
| CN | 107547388 A | 1/2018 |

* cited by examiner

METHOD AND APPARATUS FOR CONTROLLING TRAFFIC IN PACKET-BASED NETWORK

CROSS-REFERENCE TO RELATED APPLICATIONS

This application is a continuation of U.S. patent application Ser. No. 16/993,269, filed on Aug. 14, 2020, which is a continuation of International Application No. PCT/CN2018/124099, filed on Dec. 27, 2018, which claims priority to Chinese Patent Application No. 201810152118.4, filed on Feb. 14, 2018. All of the aforementioned applications are hereby incorporated by reference in their entireties.

TECHNICAL FIELD

This application relates to the communications field, and in particular, to a method and an apparatus for controlling traffic in a packet-based network.

BACKGROUND

Packet-based networks are currently based on end-to-end packet transmission provided by the internet protocol (IP). The transmission control protocol (TCP) ensures reliability of the foregoing end-to-end packet transmission process. Therefore, TCP has become the most widely used transmission protocol in packet-based networks currently. While ensuring transmission reliability, TCP can also implement traffic control by using a sliding window mechanism. In the sliding window mechanism, in a process of establishing a TCP connection between a transmit end and a receive end, the receive end notifies the transmit end of a receive window (rwnd) value of the receive end. The rwnd value is used to indicate a size of a buffer of the receive end. Specifically, the rwnd value may be carried in a window field of a TCP packet header and sent to the transmit end. The transmit end sets a send window (swnd) value of the transmit end based on the rwnd value. The swnd value is less than or equal to a smaller value of the rwnd value and a congestion window (cwnd) value. The cwnd value is used to indicate a maximum in-transit data amount of a TCP flow allowed in the network. The transmit end sends data to the receive end based on the swnd value. The receive end may notify the transmit end of an updated rwnd value based on a buffer capability change of the buffer of the receive end by using an acknowledgement (ACK) message used to acknowledge data receiving. After receiving the updated rwnd value sent by the receive end, the transmit end dynamically adjusts the swnd value of the transmit end, and the transmit end does not send data to the receive end when the rwnd value is adjusted to be close to 0. The method for implementing traffic control by using the sliding window mechanism is to detect a capability of network transmission between the transmit end and the receive end by using an AIMD mechanism. Due to relatively low control precision, this detection mechanism causes network congestion and a relatively long transmission delay.

SUMMARY

Embodiments of this application provide a method and an apparatus for controlling traffic in a packet-based network, to effectively reduce a possibility of network congestion and a transmission delay.

According to a first aspect, a method for controlling traffic in a packet-based network is provided, and the method includes: sending, by a transmit end, a first control packet to a receive end through a control channel, where the first control packet includes a parameter set; receiving, by the transmit end, a second control packet sent by the receive end, where the second control packet includes the parameter set; and after receiving the second control packet including the parameter set, sending, by the transmit end, a first data packet set to the receive end through a data channel, where the first data packet set includes C data packets, C is an integer greater than or equal to 1, and any data packet in the first data packet set includes the parameter set.

In the foregoing method, in a process in which the transmit end sends a data packet, for example, in a process in which the transmit end sends the first data packet set, the transmit end sends the first control packet to detect a congestion status on a transmission link of the first data packet set. After receiving the second control packet corresponding to the first control packet, the transmit end determines that no congestion occurs on the transmission link of the first data packet set and the first data packet set can be sent. The transmit end controls a sending pacing of a data packet by using a control packet. This helps reduce a possibility of link congestion, and therefore can effectively reduce a possibility of network congestion and a transmission delay.

The parameter set is a set of parameters that can be used to identify a traffic flow to which a data packet belongs. In an internet protocol (IP) network, the parameter set includes a 5-tuple, or the parameter set includes a source address and a destination address. The source address is a source media access control (MAC) address or a source IP address. The destination address is a destination MAC address or a destination IP address. In a fiber channel (FC) network, the parameter set includes a source address and a destination address corresponding to an FC. In a possible design, the parameter set includes the 5-tuple and a flow identifier, and the flow identifier is used to identify a traffic flow to which the first data packet set belongs. In another possible design, the parameter set includes the source address, the destination address, and the flow identifier.

The data channel and the control channel are carried on one or more physical links between the transmit end and the receive end. In a possible design, if the data channel and the control channel are carried on one physical link between the transmit end and the receive end, a sum of a bandwidth of the data channel and a bandwidth of the control channel is a bandwidth of the one physical link, and a ratio of the bandwidth of the data channel to the bandwidth of the control channel is a ratio of a sum of packet lengths of the C data packets to a packet length of any control packet. In the foregoing method, the bandwidth ratio is used to enable duration required for sending one control packet to be the same as duration required for sending C data packets. This helps fully use bandwidth resources on the physical link and reduce a transmission delay. In another possible design, if the data channel and the control channel are respectively carried on two physical links between the transmit end and the receive end, a ratio of a bandwidth of a physical link carrying the data channel to a bandwidth of a physical link carrying the control channel is a ratio of a sum of packet lengths of the C data packets to a packet length of any control packet. The physical link carrying the data channel and the physical link carrying the control channel pass through a same node. Therefore, a link status that is of the physical link carrying the control channel and that is detected by sending a control packet can indirectly reflect a link status of the physical link carrying the data channel.

When no control packet is discarded in the network, the second control packet is a control packet obtained after a source address and a destination address of the first control packet are interchanged. When a control packet is discarded in the network, the second control packet may be a control packet obtained after a source address and a destination address of a third control packet are interchanged, and the third control packet is a control packet sent by the transmit end after the transmit end sends the first control packet.

In a possible design, before the sending, by a transmit end, a first control packet to a receive end through a control channel, the method further includes: obtaining, by the transmit end, a packet header of the first control packet based on any data packet in the first data packet set, where the packet header of the first control packet includes the parameter set; and generating, by the transmit end, the first control packet based on the packet header and a preset packet length of the first control packet. In the foregoing method, the transmit end may generate, based on a data packet, a control packet corresponding to the data packet, to control a sending pacing of the data packet by using the generated control packet.

The first control packet may be buffered in a control queue of the transmit end, or the first control packet is not buffered but sent by the transmit end immediately after being generated. When the control queue exists at the transmit end, a control packet in the control queue needs to be sent through the control channel. The first data packet set may be buffered in a data queue of the transmit end, and a data packet in the data queue may be sent through the data channel.

In a possible design, after the receiving, by the transmit end, a second control packet sent by the receive end, the method further includes: sending, by the transmit end, a third control packet through the control channel according to an additive-increase/multiplicative-decrease (AIMD) algorithm, where the third control packet includes the parameter set. If the transmit end does not receive, within preset duration, a control packet fed back by the receive end, for example, if the transmit end does not receive the second control packet within the preset duration, the transmit end may delay sending the third control packet, to control a sending pacing of a data packet. In the foregoing method, in an initial link congestion phase in the packet-based network, the transmit end controls a sending pacing of a data packet by dynamically adjusting a sending pacing of a control packet. This helps reduce a probability of link congestion.

In a possible design, after the sending, by the transmit end, a third control packet through the control channel, the method further includes: receiving, by the transmit end, a fourth control packet sent by the receive end, where the fourth control packet includes the parameter set; and after receiving the fourth control packet including the parameter set, sending, by the transmit end, a second data packet set to the receive end through the data channel, where the second data packet set is after the first data packet set in a traffic flow to which the first data packet set belongs, the second data packet set includes C data packets, and any data packet in the second data packet set includes the parameter set. The C data packets included in the second data packet set are different from the C data packets included in the first data packet set.

In a possible design, the first control packet further includes a round trip time (RTT) and a sequence number, the RTT is duration from a moment at which the transmit end sends the first control packet to a moment at which the transmit end receives the second control packet, and the sequence number is used to identify the first control packet. In the foregoing method, the transmit end may determine, based on whether a sequence number included in the second control packet is consistent with the sequence number included in the first control packet, whether a packet loss occurs in the network. In addition, the transmit end may further start timing after sending the first control packet, and stop timing after receiving the second control packet. When timing duration is greater than the RTT included in the first control packet, the transmit end may determine that a link is in an initial congestion phase, and then may control a sending pacing of the third control packet according to the AIMD algorithm, for example, may delay sending the third control packet. This avoids further link congestion deterioration.

In a possible design, a ratio of a sum of packet lengths of the C data packets to a packet length of the first control packet is a ratio of a bandwidth of the data channel to a bandwidth of the control channel. The C data packets may be the C data packets in the first data packet set, or the C data packets may be the C data packets in the second data packet set. The packet length of the first control packet is a preset packet length used for generating the first control packet.

According to a second aspect, a method for controlling traffic in a packet-based network is provided, and the method includes: sending, by an intermediate node, a control packet at the head of a first control queue based on first duration, where the first duration is obtained based on a committed burst size (CBS) and a first committed information rate (CIR), and the intermediate node is configured to send a packet of a first transmit end to a first receive end in the packet-based network; and sending, by the intermediate node, a first data packet set at the head of a data queue based on the sent control packet, where the first data packet set includes C data packets, and C is an integer greater than or equal to 1.

In the foregoing method, the intermediate node controls a sending pacing of a control packet based on the first duration, so that a sending period of any data packet set in the data queue is the first duration. In the foregoing method, a sending period of any data packet set in the packet-based network is the first duration, and the first duration is a parameter related to a link status. Therefore, when no link congestion occurs, a sending pacing of a data packet is controlled in advance based on the link status. This can effectively reduce a possibility of network congestion and a transmission delay.

In a possible design, the method further includes: receiving, by the intermediate node, a first control packet from the first transmit end, where the first control packet includes a first parameter set; receiving, by the intermediate node, a second control packet sent by a second transmit end in the packet-based network, where the second control packet includes a second parameter set, the second parameter set is different from the first parameter set, and the intermediate node is configured to send a packet of the second transmit end to a second receive end in the packet-based network; and placing, by the intermediate node, the first control packet and the second control packet in the first control queue in a sequence of receiving the first control packet and the second control packet. The intermediate node may receive the second control packet before the intermediate node sends the control packet at the head of the first control queue, or the intermediate node receives the second control packet while sending the control packet at the head of the first control queue.

In a possible design, the C data packets are data packets from the first transmit end, and the data packets from the first transmit end each include the first parameter set; or the C data packets are data packets from the second transmit end, and the data packets from the second transmit end each include the second parameter set.

In a possible design, after the sending, by an intermediate node, a control packet at the head of a first control queue based on first duration, the method further includes: when a sum of packet lengths of data packets that have been buffered in the data queue is greater than or equal to a first threshold and less than a second threshold, obtaining, by the intermediate node, second duration based on the CBS and a second CIR, where the second CIR is less than the first CIR, the first threshold is greater than a sum of packet lengths of the C data packets, and the second threshold is a maximum value of a sum of packet lengths of data packets that can be buffered in the data queue; sending, by the intermediate node, a control packet at the head of the first control queue based on the second duration; and sending, by the intermediate node, a second data packet set at the head of the data queue based on the sent control packet, where the second data packet set includes C data packets. The second duration is greater than the first duration. The data packets included in the second data packet set may be from the first transmit end or the second transmit end. In the foregoing method, after finding that a buffered data packet in the data queue cannot be sent in time, the intermediate node prolongs a sending period of a control packet in the first control queue. Therefore, a transmit end delays receiving a control packet fed back by a receive end, so that the transmit end delays sending C data packets. The intermediate node may send a buffered data packet by using a delayed time. For example, the intermediate node may accelerate sending of the buffered data packet within the delayed time. For example, the intermediate node may send the buffered data packet within the delayed time without triggering by a control packet.

In a possible design, after the sending, by an intermediate node, a control packet at the head of a first control queue based on first duration, the method further includes: when duration in which the data queue is in an idle state reaches a third threshold, obtaining, by the intermediate node, third duration based on the CBS and a third CIR, where the third CIR is greater than the first CIR, the third threshold is a larger value of a first RTT and a second RTT, the first RTT is duration from a moment at which the intermediate node sends the first control packet to a moment at which the intermediate node receives C data packets of which sending is triggered by the first control packet, and the second RTT is duration from a moment at which the intermediate node sends the second control packet to a moment at which the intermediate node receives C data packets of which sending is triggered by the second control packet; sending, by the intermediate node, a control packet at the head of the first control queue based on the third duration; and sending, by the intermediate node, a second data packet set at the head of the data queue based on the sent control packet, where the second data packet set includes C data packets. The third duration is less than the first duration. The data packets included in the second data packet set may be from the first transmit end or the second transmit end. The idle state is a state in which there is no to-be-sent data packet in the data queue. In the foregoing method, if the intermediate node finds that there is no to-be-sent data packet in the data queue within a duration range corresponding to the third threshold, the intermediate node shortens a sending period of a control packet in the first control queue. Therefore, a transmit end accelerates receiving of a control packet fed back by a receive end, so that the transmit end can quickly send C data packets. This helps fully use network bandwidth resources.

In a possible design, after the sending, by an intermediate node, a control packet at the head of a first control queue based on first duration, the method further includes: when a sum of packet lengths of data packets that have been buffered in the data queue is greater than or equal to a second threshold, sending, by the intermediate node, a second data packet set at the head of the data queue, and stopping sending a control packet at the head of the first control queue, where the second data packet set includes C data packets, and the second threshold is a maximum value of a sum of packet lengths of data packets that can be buffered in the data queue. In the foregoing method, after a quantity of buffered data packets in the data queue that are sent by the intermediate node reaches a buffer upper limit, the intermediate node stops sending a control packet in the first control queue. This prevents a data packet sent by a transmit end from being discarded because the data packet cannot be buffered in the data queue of the intermediate node.

In a possible design, before the sending, by an intermediate node, a control packet at the head of a first control queue based on first duration, the method further includes: receiving, by the intermediate node, a first control packet from the first transmit end, and placing the first control packet in the first control queue, where the first control packet includes a first parameter set; and receiving, by the intermediate node, a second control packet from a second transmit end, and placing the second control packet in a second control queue, where a priority of the second control queue is lower than a priority of the first control queue, the second control packet includes a second parameter set, the second parameter set is different from the first parameter set, and the intermediate node is configured to send a packet of the second transmit end to a second receive end in the packet-based network. The sending, by an intermediate node, a control packet at the head of a first control queue based on first duration includes: sending, by the intermediate node based on the priority of the first control queue and the priority of the second control queue, a control packet in the first control queue or a control packet in the second control queue according to a priority scheduling policy after the first duration expires, where the priority scheduling policy is priority queuing (PQ) or weighted fair queuing (WFQ). In the foregoing method, priorities are set for different control queues, so that a data packet of a traffic flow having a low delay requirement can be preferentially sent, and the traffic flow having a low delay requirement cannot be sent.

In a possible design, the first control packet includes the first parameter set, the first RTT, and C sequence numbers, the first RTT is the duration from the moment at which the intermediate node sends the first control packet to the moment at which the intermediate node receives the C data packets of which sending is triggered by the first control packet, and before the sending, by an intermediate node, a control packet at the head of a first control queue based on first duration, the method further includes: when the data queue includes a free and unreserved storage space and a registration table of the intermediate node includes C unoccupied entries, determining, by the intermediate node, to reserve a first storage space, where the first storage space is used to buffer the C data packets of which sending is triggered by the first control packet; generating, by the intermediate node, C identifiers based on the first parameter set and the C sequence numbers, where an $i^{th}$ identifier in the C identifiers is an identifier generated based on the first parameter set and an $i^{th}$ sequence number in the C sequence numbers, and i is an integer that ranges from 1 to C; and writing, by the intermediate node, the first RTT and the C identifiers into the C unoccupied entries, where an $i^{th}$ entry in the C entries includes the first RTT and the $i^{th}$ identifier. In the foregoing method, the intermediate node reserves a specific storage space before sending a control packet. Therefore, C data packets of which sending is triggered by the sent control packet can be prevented from being discarded because the C data packets cannot be buffered when the C data packets reach the intermediate node. This helps reduce a possibility of discarding a data packet.

When the intermediate node has a function of dynamically adjusting a sending period of a control packet and has the foregoing function of reserving a storage space, the sum of the packet lengths of the data packets that have been buffered in the data queue of the intermediate node may be a sum of packet lengths of data packets placed in the data queue, or may be a sum of packet lengths of data packets corresponding to the first storage space. The duration in which the data queue of the intermediate node is in an idle state is duration in which no reserved storage space exists and no data packet is buffered in the data queue of the intermediate node.

In a possible design, after the writing, by the intermediate node, the first RTT and the C identifiers into the C unoccupied entries, the method further includes: setting, by the intermediate node, an $i^{th}$ timer for the $i^{th}$ entry in the C entries, where duration of the $i^{th}$ timer is the first RTT; and if the intermediate node does not receive an $i^{th}$ data packet before the $i^{th}$ timer expires, releasing, by the intermediate node, the $i^{th}$ entry in the C entries and a storage space that is reserved for the $i^{th}$ data packet in the first storage space, where the $i^{th}$ data packet is any one of the C data packets of which sending is triggered by the first control packet, and the $i^{th}$ data packet includes the first parameter set and the $i^{th}$ sequence number. In the foregoing method, the intermediate node monitors, by using the first RTT and the $i^{th}$ timer, a time point at which the $i^{th}$ data packet arrives; and if the intermediate node does not receive the $i^{th}$ data packet within a preset time, the intermediate node may release the storage space that is reserved for the $i^{th}$ data packet and the corresponding entry. This can help properly and fully use buffer resources.

In a possible design, the first data packet set includes the C data packets of which sending is triggered by the first control packet, a $j^{th}$ data packet in the first data packet set includes the first parameter set and a $j^{th}$ sequence number, j is an integer that ranges from 1 to C, and before the sending, by the intermediate node, a first data packet set at the head of a data queue based on the sent control packet, the method further includes: generating, by the intermediate node, a $j^{th}$ identifier based on the first parameter set and the $j^{th}$ sequence number that are included in the $j^{th}$ data packet; after determining that the registration table includes the $j^{th}$ identifier, placing, by the intermediate node, the $j^{th}$ data packet in the data queue of the intermediate node; and releasing, by the intermediate node, an entry including the $j^{th}$ identifier in the registration table. In the foregoing method, after receiving the $j^{th}$ data packet, the intermediate node may release the corresponding entry in the registration table. This helps fully use entry resources.

In a possible design, the first data packet set includes the C data packets of which sending is triggered by the first control packet, a $j^{th}$ data packet in the first data packet set includes the first parameter set and a $j^{th}$ sequence number, j is an integer that ranges from 1 to C, and before the sending, by the intermediate node, a first data packet set at the head of a data queue based on the sent control packet, the method further includes: generating, by the intermediate node, a $j^{th}$ identifier based on the first parameter set and the $j^{th}$ sequence number that are included in the $j^{th}$ data packet; after determining that the registration table does not include the $j^{th}$ identifier, determining, by the intermediate node, whether the data queue includes a free and unreserved storage space that can accommodate the $j^{th}$ data packet; and after determining that the data queue includes the free and unreserved storage space that can accommodate the $j^{th}$ data packet, placing, by the intermediate node, the $j^{th}$ data packet in the data queue of the intermediate node. In the foregoing method, after a time point at which the intermediate node receives the $j^{th}$ data packet exceeds timing duration of a timer, the intermediate node releases an entry corresponding to the $j^{th}$ data packet, and the intermediate node may determine, based on a buffer status in the data queue, whether to place the $j^{th}$ data packet in the data queue, to prevent the $j^{th}$ data packet from being discarded because the entry is released.

In a possible design, the method further includes: after determining that the data queue does not include the free and unreserved storage space that can accommodate the $j^{th}$ data packet, discarding, by the intermediate node, the $j^{th}$ data packet.

For the intermediate node, a control packet in any control queue of the intermediate node may be sent through a control channel connected to the intermediate node, and a data packet in any data queue of the intermediate node may be sent through a data channel connected to the intermediate node. The data channel and the control channel may be carried on one or more physical links. A ratio of a bandwidth of the data channel to a bandwidth of the control channel is a ratio of a sum of packet lengths of C data packets to a packet length of any control packet.

According to a third aspect, a source device in a packet-based network is provided, and the source device includes a module that can implement a function corresponding to the first aspect or any possible design of the first aspect. The source device may be the transmit end mentioned in the first aspect or any possible design of the first aspect.

According to a fourth aspect, an intermediate device in a packet-based network is provided, and the intermediate device includes a module that can implement a function corresponding to the second aspect or any possible design of the second aspect. The intermediate device may be the intermediate node mentioned in the second aspect or any possible design of the second aspect.

According to a fifth aspect, a destination device in a packet-based network is provided, and the destination device includes a receiving module, a generation module, and a sending module. The receiving module is configured to receive a first control packet from a source device. The first control packet includes a parameter set. The generation module is configured to generate a second control packet based on the first control packet. A source address of the second control packet is a destination address of the first control packet, and a destination address of the second control packet is a source address of the first control packet. The sending module is configured to send the second control packet to the source device. The source address of the second control packet is an address of the destination device, and the destination address of the second control packet is an address of the source device. The destination device may be the receive end mentioned in the first aspect, any possible design of the first aspect, the second aspect, or any possible design of the second aspect.

According to a sixth aspect, a computer readable storage medium is provided. The computer readable storage medium includes an instruction, and when the instruction is run on a computer, the computer is enabled to perform the method for controlling traffic in a packet-based network according to the first aspect or any possible design of the first aspect.

According to a seventh aspect, a computer readable storage medium is provided. The computer readable storage medium includes an instruction, and when the instruction is run on a computer, the computer is enabled to perform the method for controlling traffic in a packet-based network according to the second aspect or any possible design of the second aspect.

According to an eighth aspect, a computer program product including an instruction is provided. When the computer program product is run on a computer, the computer is enabled to perform the method for controlling traffic in a packet-based network according to the first aspect or any possible design of the first aspect.

According to a ninth aspect, a computer program product including an instruction is provided. When the computer program product is run on a computer, the computer is enabled to perform the method for controlling traffic in a packet-based network according to the second aspect or any possible design of the second aspect.

According to a tenth aspect, a source device in a packet-based network is provided, and the source device includes a processor, a memory, a bus, and a communications interface. The memory is configured to store a computer-executable instruction, the processor and the memory are connected by using the bus, and when the source device runs, the processor executes the computer-executable instruction stored in the memory, so that the source device performs the method for controlling traffic in a packet-based network according to the first aspect or any possible design of the first aspect. The source device may be the transmit end mentioned in the first aspect or any possible design of the first aspect.

According to an eleventh aspect, an intermediate device in a packet-based network is provided, and the intermediate device includes a processor, a memory, a bus, and a communications interface. The memory is configured to store a computer-executable instruction, the processor and the memory are connected by using the bus, and when the intermediate device runs, the processor executes the computer-executable instruction stored in the memory, so that the intermediate device performs the method for controlling traffic in a packet-based network according to the second aspect or any possible design of the second aspect. The intermediate device may be the intermediate node mentioned in the second aspect or any possible design of the second aspect.

According to a twelfth aspect, a system for controlling traffic in a packet-based network is provided, and the system includes the source device provided in the third aspect or the tenth aspect, and the intermediate device provided in the fourth aspect or the eleventh aspect. In a possible design, the system further includes the destination device provided in the fifth aspect.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

The following describes the embodiments of this application with reference to the accompanying drawings.

Embodiment 1

Figure 1:
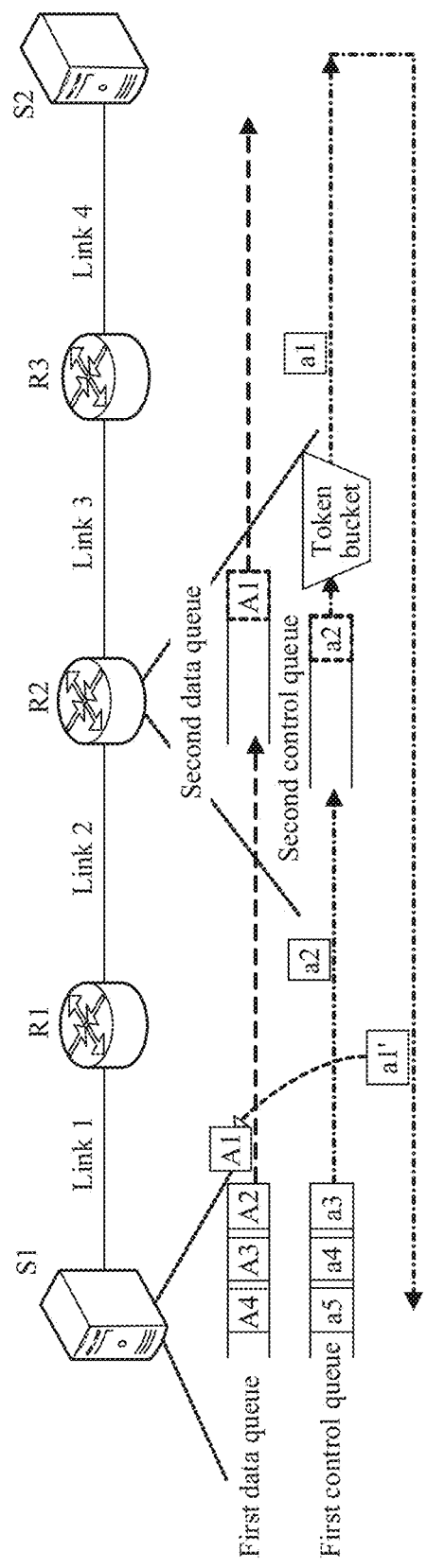
FIG. 1 is a schematic diagram of a scenario according to Embodiment 1 of this application.

FIG. 1 is a schematic diagram of a scenario according to Embodiment 1 of this application. In the scenario provided in Embodiment 1 of this application, S1 represents a source host serving as a transmit end, S2 represents a destination host serving as a receive end, R1 represents a first forwarding device, R2 represents a second forwarding device, and R3 represents a third forwarding device. A physical link between S1 and S2 is a first physical link. The first physical link includes a link 1 between S1 and R1, a link 2 between R1 and R2, a link 3 between R2 and R3, and a link 4 between R3 and S2. A port of the link 1 on S1 includes a first data queue and a first control queue. The first data queue is used to store at least one data packet. In the scenario shown in FIG. 1, the first data queue includes a data packet A1, a data packet A2, a data packet A3, and a data packet A4. The first control queue is used to store at least one control packet. In the scenario shown in FIG. 1, the first control queue includes a control packet a1, a control packet a2, a control packet a3, a control packet a4, and a control packet a5. A port of the link 3 on R2 includes a second data queue, a second control queue, and a token bucket. The second data queue is used to store a data packet from the link 2. The second control queue is used to store a control packet from the link 2. The token bucket is configured to schedule a control packet in the second control queue. R1 and R3 may also use a structure of R2 in FIG. 1. In other words, an egress port of any forwarding device is provided with a data queue, a control queue, and a token bucket. For functions of a data queue, a control queue, and a token bucket provided on either of R1 and R3, refer to related descriptions of R2. The link 3 may become a bottleneck link on the physical link between S1 and S2. The bottleneck link is a link on which a smallest bandwidth can be allocated and that is in links through which a traffic flow passes. In the scenario shown in FIG. 1, the link 1, the link 2, the link 3, and the link 4 are links through which the traffic flow passes. Compared with the link 1, the link 2, and the link 4, a bandwidth that can be allocated to the traffic flow on the link 3 is the smallest. Therefore, the link 3 is the bottleneck link. Different traffic flows may have a same bottleneck link, or may have different bottleneck links, and one traffic flow may have different bottleneck links at different time points.

Figure 2:
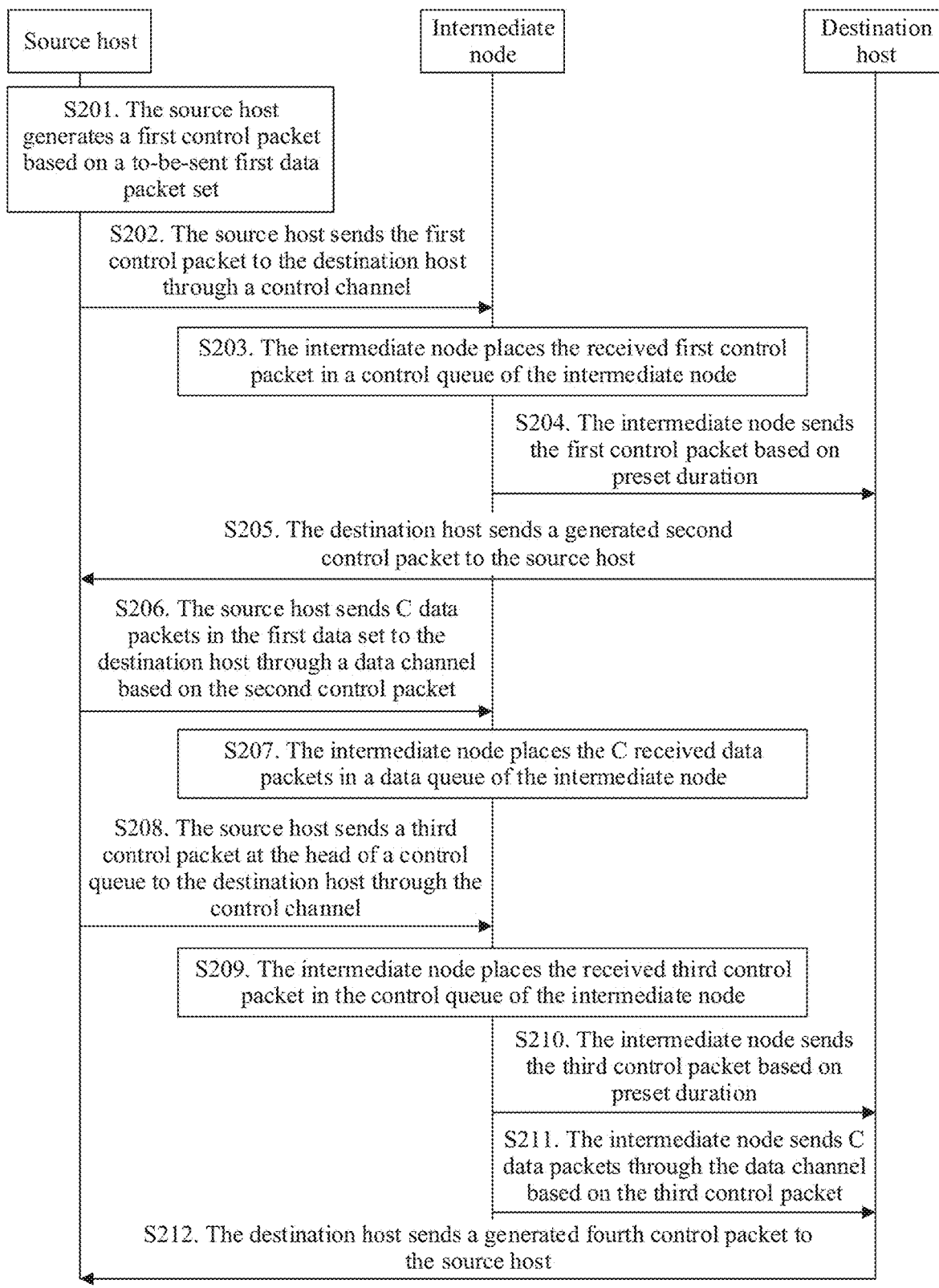
FIG. 2 is a schematic flowchart of a method for controlling traffic in a packet-based network according to Embodiment 1 of this application.

FIG. 2 is a schematic flowchart of a method for controlling traffic in a packet-based network according to Embodiment 1 of this application. The method provided in Embodiment 1 may be applied to the scenario shown in FIG. 1. With reference to FIG. 1 and FIG. 2, the following describes the method for controlling traffic in a packet-based network according to Embodiment 1 of this application.

S201. The source host generates a first control packet based on a to-be-sent first data packet set.

For example, that the source host generates a first control packet based on a to-be-sent first data packet set includes: obtaining, by the source host, a packet header of the first control packet based on the to-be-sent first data packet set; and generating, by the source host, the first control packet based on the packet header of the first control packet and a packet length of the first control packet. The packet length of the first control packet may be set to a sum of 1 and a value that is obtained after a quotient of M and N is rounded down, where M is a path maximum transmission unit (PMTU), and N is a ratio of a bandwidth of a data channel to a bandwidth of a control channel. There is a correspondence between the packet header of the first control packet and a packet header of any data packet in the first data packet set. In other words, the source host may determine, based on a parameter set carried in the packet header, a data packet corresponding to the first control packet.

In an implementation, considering that a packet loss may occur in the network, the source host generates L1 control packets corresponding to the any data packet, and the first data packet set includes L2 data packets whose data amounts each are M, where L1 is greater than or equal to L2, and L2 is an integer greater than or equal to 1. In another manner, the source host may generate L2 control packets corresponding to the any data packet. If it is detected that a packet loss occurs in the network, the source host may further generate, based on L3 lost packets obtained through detection, L3 control packets corresponding to the any data packet, where L3 is an integer greater than or equal to 1. Triggered by a corresponding control packet, each of data packets whose data amounts are M in the first data packet set can be sent through the data channel.

The to-be-sent first data packet set includes at least one data packet whose data amount is M. For example, the to-be-sent first data packet set includes a first data packet and a second data packet. A data amount of the first data packet is M, and a data amount of the second data packet is M. The first data packet is used as an example. The packet header of the first control packet and a packet header of the first data packet include a same parameter set. The parameter set includes one or more parameters. For example, in an IP network, the packet header of the first control packet and the packet header of the first data packet include a same 5-tuple, and one parameter in the 5-tuple is one parameter in the parameter set. Alternatively, the packet header of the first control packet and the packet header of the first data packet include a same source address and a same destination address. The source address includes at least one of a source media access control (MAC) address and a source internet protocol (IP) address. The destination address includes at least one of a destination MAC address and a destination IP address. In a fiber channel (FC) network, the packet header of the first control packet and the packet header of the first data packet include a same source address and a same destination address. The source address is a source address corresponding to an FC, and the destination address is a destination address corresponding to the FC. When the packet header of the first data packet further includes a flow identifier, and the flow identifier is used to identify a traffic flow to which the first data packet set belongs, the packet header of the first control packet may further include the flow identifier in addition to the source address and the destination address.

A method in which the source host obtains the packet length of the first control packet is not limited to the foregoing manner. The source host may further set the packet length of the first control packet to a preset value, and then the source host may determine N based on M and the packet length of the first control packet. The data channel is used to transmit a data packet, and the control channel is used to transmit a control packet. The data channel and the control channel may be carried on one or more physical links. In this embodiment of this application, an example in which the data channel and the control channel are carried on a first physical link is used for description. The first physical link is a physical link between the source host and a destination host. There are mainly three implementations for the data channel and the control channel: A first manner is logical segmentation. To be specific, the data channel is represented as a data queue on an egress port of a device, the control channel is represented as a control queue on the egress port of the device, and the device is the source host, an intermediate node, or the destination host. The intermediate node may be a forwarding device in the network, for example, a router, a switch, a gateway, or a GGSN. A second manner is physical segmentation. To be specific, the data channel and the control channel may be two time division multiplexing (TDM) channels on an egress port of a device. A third manner is logical segmentation. To be specific, the data channel is represented as a data queue on an egress port of a device, and an egress port of the source host may not include a control queue in a case in which the source host does not buffer a generated control packet. This helps reduce memory overheads on the source host. The case in which the source host does not buffer a generated control packet means that the source host immediately sends a control packet after generating the control packet. When the data channel and the control channel are carried on two physical links, a ratio of a bandwidth of a physical link carrying the data channel to a bandwidth of a physical link carrying the control channel is N.

In the scenario shown in FIG. 1, the first data queue includes at least one data packet. In an initial phase, the at least one data packet includes the data packet A1, the data packet A2, the data packet A3, and the data packet A4. The data packet A1 is a data packet at the head of the first data queue. The data packet A1 is the first data packet, and the data packet A2 is the second data packet. The first control queue includes at least one control packet. In the initial phase, the at least one control packet includes the control packet a1, the control packet a2, the control packet a3, the control packet a4, and the control packet a5. The control packet a1 is the first control packet. The control packet a1 is a control packet at the head of the first control queue. The initial phase is a phase in which S1 does not send any data packet or any control packet. In the IP network, the data packet A1, the data packet A2, the data packet A3, and the data packet A4 have a same 5-tuple. The data packet A1, the data packet A2, the data packet A3, and the data packet A4 belong to a same traffic flow. S1 may generate, based on any data packet, a control packet corresponding to the any data packet, where a packet length of the any control packet is Ls, and a packet length of the any data packet is Ld. A formula of calculating a percentage of a bandwidth allocated to the control channel may be expressed as follows:

$$\frac{Ls}{Ls + Ld * C}.$$

A formula of calculating a percentage of a bandwidth allocated to the data channel may be expressed as follows:

$$1 - \frac{Ls}{Ls + Ld * C}.$$

In the foregoing formulas, C represents C data packets that are sent by the source host to the destination host each time the source host receives one control packet from the destination host, and C is an integer greater than or equal to 1. When Ls is 84 bytes, Ld is 1596 bytes, and C is 1, S1 may learn, according to the foregoing calculation formulas, that the percentage of the bandwidth of the data channel in a bandwidth of the first physical link is 1596/(84+1596)=95%, and the percentage of the bandwidth of the control channel in the bandwidth of the first physical link is 84/(84+1596) =5%. Based on the foregoing bandwidth percentages, for example, if the bandwidth of the first physical link is 10 G, the bandwidth of the data channel is 9.5 Gbps, and the bandwidth of the control channel is 500 Mbps. In this embodiment of this application, a packet length and a data amount may be mutually replaced. For example, if a packet length of a packet is 84 bytes, it indicates that a data amount occupied by the packet is 84 bytes.

In an implementation, the source host may add an identifier to the generated first control packet. The identifier is used to identify that a packet in which the identifier is located is a control packet. The intermediate node and the destination host that receive the first control packet can distinguish between the first control packet and the any data packet based on the identifier. For example, in the IP network, the identifier may be implemented by using one or more specific bits in a type of service (TOS) field or a differentiated services code point (DSCP) field in the packet header of the first control packet.

S202. The source host sends the first control packet to the destination host through the control channel.

For example, the first control packet sent by the source host is sent to the destination host hop by hop through the intermediate node between the source host and the destination host. In this embodiment of this application, an example in which the first control packet in S202 is an initial control packet sent between the source host and the destination host is used to describe the method for controlling traffic in a packet-based network. In the scenario shown in FIG. 1, S1 may send the control packet a1 by using the port connected to the link 1, and the control packet a1 is sent to R2 through a path: link 1→R1→link 2. For the structure of R1, refer to related descriptions of R2. For a manner in which R1 processes the control packet a1, refer to a manner in which R2 processes the control packet a1. In a phase in which S1 sends the control packet a1, the first data queue includes the data packet A1, the data packet A2, the data packet A3, and the data packet A4. After the control packet a1 is sent, the control packet a2 is at the head of the first control queue.

S203. The intermediate node places the received first control packet in a control queue of the intermediate node.

For example, the first control packet received by the intermediate node is the initial control packet mentioned in S202. When the control queue of the intermediate node is empty, the intermediate node places the first control packet at the head of the control queue of the intermediate node. In this embodiment of this application, an egress port of the intermediate node includes a data queue and the control queue. In the scenario shown in FIG. 1, the first control packet mentioned in S202 and S203 is the control packet a1, and the intermediate node in Embodiment 1 is R2. R2 places the control packet a1 at the head of the second control queue, no data packet is buffered in the second data queue, and control packets subsequently received by R2 through the link 2 may be placed in the second control queue in a receiving sequence.

For example, when the control queue of the intermediate node does not overflow, the intermediate node places the first control packet at the tail of the control queue of the intermediate node. That the control queue does not overflow indicates that the control queue of the intermediate node includes a storage space to buffer a received control packet. If the control queue of the intermediate node overflows, the intermediate node discards the first control packet. That the control queue overflows indicates that the control queue of the intermediate node includes no storage space to buffer a received control packet. Because there is another control packet buffered in the control queue of the intermediate node, behavior of discarding the first control packet by the intermediate node does not affect transmission of any data packet in this embodiment of this application.

S204. The intermediate node sends the first control packet based on preset duration.

For example, the first control packet is at the head of the control queue of the intermediate node. The preset duration is a quotient of a committed burst size (CBS) and a committed information rate (CIR). The CBS may be the packet length of the first control packet. The CIR may be the bandwidth occupied by the control channel. The intermediate node may read, by using a token bucket provided on the egress port of the intermediate node, the first control packet at the head of the control queue of the intermediate node. The token bucket provided on the egress port of the intermediate node sends the read first control packet based on the preset duration. When the first control packet is sent, the intermediate node sends C data packets in the data queue of the intermediate node, where C is an integer greater than or equal to 1. The C data packets are C obtained data packets starting from the head of the data queue of the intermediate node. Because the first control packet at the head of the control queue of the intermediate node is the initial control packet sent by the source host in S202, when the intermediate node sends the first control packet, a data packet sent by the source host is not buffered in the data queue of the intermediate node. In this step, sending of the first control packet does not cause the intermediate node to send any data packet. When the CBS is 84 bytes and the CIR is 500 Mbps, the preset duration is 1.344 µs. Specifically, the preset duration may be a value obtained after 84 bytes are multiplied by 8 and a product is divided by 500 Mbps. In the scenario shown in FIG. 1, the token bucket on R2 sends one control packet in the second control queue at an interval of 1.344 µs. When a control packet at the head of the second control queue is the control packet a1, the token bucket of R2 sends the control packet a1 when 1.344 µs is reached.

S205. The destination host sends a generated second control packet to the source host.

For example, the destination host receives the first control packet from the intermediate node. The destination host may interchange the destination address and the source address of the first control packet, to obtain the second control packet. The destination address of the first control packet is a source address of the second control packet, and the source address of the first control packet is a destination address of the second control packet. The destination address of the second control packet is an address of the source host, and the source address of the second control packet is an address of the destination host. The destination host may send the second control packet through a second physical link. The second physical link is a physical link through which the second control packet passes from the destination host to the source host. The second physical link may be different from the first physical link. If no packet loss occurs on the first physical link, the first control packet received by the destination host is the initial control packet sent by the source host in S202.

In an implementation, if the first control packet generated by the source host in S202 further includes a first sequence number, the second control packet sent by the destination host in S205 further includes the first sequence number. The second control packet in S205 is a control packet obtained after the destination address and the source address of the first control packet in S202 are interchanged.

In an implementation, the first control packet generated by the source host in S202 further includes a first explicit congestion notification (ECN) identifier, and the first ECN identifier is used to indicate that no link congestion occurs. For example, a value of the first ECN identifier is 0. In a process of forwarding the first control packet through the first physical link, if packet accumulation occurs on an egress port of a specific intermediate node, the first ECN identifier may be replaced with a second ECN identifier, and the second ECN identifier is used to identify that link congestion may occur. For example, a value of the second ECN identifier is 1. The destination host determines, based on the second ECN identifier in the first control packet, that the control channel of the first physical link may be congested. The second control packet in S205 further includes the second ECN identifier.

In the scenario shown in FIG. 1, the control packet a1 sent by R2 is sent to S2 through a path: link 3→R3→link 4. For the structure and a function of R3, refer to related descriptions of R2. For a manner in which R3 processes the control packet a1, refer to the manner in which R2 processes the control packet a1. After receiving the control packet a1, S2 may interchange a destination address and a source address of the control packet a1, to obtain a control packet a1'. A destination address of the control packet a1' is the source address of the control packet a1, and a source address of the control packet a1' is the destination address of the control packet a1. In an implementation, if the control packet a1 further includes the first sequence number, the control packet a1' further includes the first sequence number. In an implementation, if the control packet a1 further includes the first ECN identifier, the control packet a1' further includes the first ECN identifier. If the control packet a1 further includes the second ECN identifier, the control packet a1' further includes the second ECN identifier. A transmission path of the control packet a1' may be different from a transmission path of the control packet a1.

S206. The source host sends C data packets in the first data packet set to the destination host through the data channel based on the second control packet.

For example, the C data packets are C data packets starting from the head of the first data packet set. When C is 1, the data packet sent by the source host through the data channel is the first data packet. The first data packet is the data packet whose data amount is M in the to-be-sent first data packet set in S201. The first data packet is at the head of the data queue of the source host. The source host determines that the second control packet corresponds to any data packet in the first data packet set. For example, if the source host determines that a packet header of the second control packet and the packet header of the first data packet include a same parameter set, the source host sends the first data packet. When C is 1, after the first data packet is sent, a data packet at the head of the data queue of the source host is the second data packet. When C is 2, the source host sends the first data packet and the second data packet based on the second control packet. When C is greater than 2, for a manner in which the source host processes a data packet in the data queue of the source host, refer to the processing manner used by the source host when C is 2.

In the scenario shown in FIG. 1, S1 receives the control packet a1' from S2, and S1 determines that the control packet a1' corresponds to a data packet in the first data queue. In an implementation, S1 may determine, based on a fact that a packet header of the control packet a1' and a packet header of the data packet A1 include a same parameter set, that the control packet a1' corresponds to the data packet A1 in the first data queue. In another manner, after S1 interchanges the source address and the destination address of the control packet a1', when the source address of the control packet a1' is the same as a source address of a data packet in the first data queue and the destination address of the control packet a1' is the same as a destination address of the data packet in the first data queue, S1 determines that the control packet a1' corresponds to the data packet in the first data queue. If C is 1, S1 sends the data packet A1 by using the port (an egress port) connected to the link 1. After the data packet A1 is sent, the data packet A2 becomes a data packet at the head of the first data queue. The data packet A1 is sent to R2 through the path: link 1→R1→link 2. R1 may receive the data packet A1 through the link 1, and place the data packet A1 in the data queue of R1. If C is 2, S1 sends the data packet A1 and the data packet A2 by using the egress port. If C is 4, S1 sends the data packet A1, the data packet A2, the data packet A3, and the data packet A4 by using the egress port. For a method for transmitting each of the data packet A2, the data packet A3, and the data packet A4 on the first physical link, refer to the method for transmitting the data packet A1 on the first physical link.

In the method provided in this embodiment of this application, the source host may detect a congestion status of the first physical link by using the first control packet with a relatively small data amount. Because the bandwidth occupied by the control channel is relatively small, transmission of the first control packet on the first physical link does not affect normal transmission of any data packet. According to the method provided in this embodiment, in a data packet transmission process, a sending pacing of a data packet can be controlled based on a detection result obtained by using a control packet corresponding to the data packet, so that congestion is avoided in the data packet transmission process.

S207. The intermediate node places the C received data packets in the data queue of the intermediate node.

For example, the C data packets received by the intermediate node are the C data packets starting from the head of the data queue of the source host in S206. When the data queue of the intermediate node is empty, the intermediate node places the C data packets in the data queue of the intermediate node. In the scenario shown in FIG. 1, when C is 1, the C data packets mentioned in S206 and S207 are the first data packet, in other words, the data packet A1 in FIG. 1. The data packet A1 is an initial data packet received by R2. As shown by a dashed line in the second data queue in FIG. 1, the data packet A1 is placed at the head of the second data queue, and data packets subsequently received by R2 through the link 2 may be placed in the second data queue in a receiving sequence. When C is 2, the C data packets mentioned in S206 and S207 are the data packet A1 and the data packet A2 in FIG. 1, and R2 places the data packet A1 at the head of the second data queue and places the data packet A2 immediately adjacent to the data packet A1 in the second data queue.

In the method provided in this embodiment of this application, steps corresponding to S201 to S207 may be performed in a number sequence.

S208. The source host sends a third control packet at the head of the control queue to the destination host through the control channel.

For example, the third control packet is a control packet that is second generated by the source host. After generating the first control packet, the source host generates the third control packet based on any data packet in the first data packet set. The source host may generate the third control packet by using the method in S201. When a control packet generated by the source host does not include a sequence number, the third control packet and the first control packet are same control packets sent at different time points. When a control packet generated by the source host includes a sequence number, a sequence number included in the third control packet is different from the sequence number included in the first control packet. In the scenario shown in FIG. 1, the control packet a2 is the third control packet. After sending the control packet a1, S1 may send the control packet a2. The control packet a2 may be sent to R2 through the path: link 1→R1→link 2. For a specific sending manner, refer to the manner of sending the control packet a1. After the control packet a2 is sent, the control packet a3 is at the head of the first control queue.

In an implementation, after sending the first control packet, the source host may send a control packet in the first control queue at a constant speed. The constant-speed sending is sending a control packet in the first control queue at a same interval, and duration of the interval is t. Alternatively, the constant-speed sending is periodically sending a control packet in the first control queue, and duration of the period is t. Herein, t may be the preset duration. For example, t may be 1.344 us. If the third control packet is a packet at the head of the first control queue after the first control packet is sent, duration between a moment of sending the third control packet and a moment of sending the first control packet is t. For example, the source host may start timing after performing S201, and perform S208 when a time point corresponding to the duration t is reached.

In another implementation, the source host may send a control packet in the first control queue according to an additive-increase multiplicative-decrease (AIMD) algorithm commonly used in TCP. When S208 is performed between S202 and S205, according to the AIMD algorithm, the source host does not need to wait for the second control packet fed back by the destination host, and the source host may linearly accelerate sending of the third control packet and a subsequent control packet included in the control queue of the source host. When S208 is performed after S205, the source host determines that no control packet is lost, and the source host may linearly accelerate sending of the third control packet and a subsequent control packet included in the control queue of the source host. This implementation can ensure fairness of network bandwidth allocation.

S209. The intermediate node places the received third control packet in the control queue of the intermediate node.

For example, S209 may be performed after S203. For a manner in which the intermediate node processes the third control packet, refer to the manner in which the intermediate node processes the first control packet in S203. When S208 is performed between S202 and S205, the third control packet may arrive at the intermediate node before the first data packet. When S208 is performed after S205, the third control packet and the first data packet may simultaneously arrive at the intermediate node, or the third control packet may arrive at the intermediate node before the first data packet. In the scenario shown in FIG. 1, R2 places the control packet a2 obtained from the link 2 in the second control queue, for example, a dashed line of the second control queue in FIG. 1. As S1 sends a subsequently generated control packet, control packet accumulation may occur in the second control queue (not shown in FIG. 1).

S210. The intermediate node sends the third control packet based on preset duration.

For example, the intermediate node may send the third control packet by using the method in S204. In the scenario shown in FIG. 1, when the token bucket of R2 reads the control packet a2 from the second control queue and timing reaches 1.344 us, the control packet a2 is sent by using the port connected to the link 3.

S211. The intermediate node sends C data packets through the data channel based on the third control packet.

For example, the C data packets sent by the intermediate node are C data packets starting from the head of the data queue of the intermediate node. S211 is performed after S210. In other words, after sending the first control packet at the head of the control queue of the intermediate node, the intermediate node sends the C data packets in the data queue of the intermediate node. When C is 1, it can be learned according to S207 that the data queue of the intermediate node includes at least the first data packet, and the first data packet is at the head of the data queue of the intermediate node. An action of sending the third control packet by the intermediate node triggers the intermediate node to send the first data packet.

In the scenario shown in FIG. 1, the data packet A1 received by R2 is at the head of the second data queue. When C is 1, after sending the control packet a2, R2 sends the data packet A1 through the link 3. The data packet A1 may be sent to S2 through a path: link 3→R3→link 4. When C is 2, after sending the control packet a2, R2 sends, through the link 3, two data packets starting from the head of the second data queue, for example, the data packet A1 and the data packet A2. The data packet A1 and the data packet A2 may be sent to S2 through the path: link 3→R3→link 4. R3 may send a received data packet in the manner used by R2.

S212. The destination host sends a generated fourth control packet to the source host.

For example, the destination host generates the fourth control packet based on the third control packet. For a specific generation method, refer to the method for generating the second control packet in S205. S212 may be performed after S210, and S212 may be performed before or after S211. In the scenario shown in FIG. 1, S2 may process the received control packet a2 in the manner of processing the control packet a1, to obtain a control packet a2' (not shown in FIG. 1).

For example, after receiving the fourth control packet, the source host may send, with reference to the method in S206, C data packets starting from the head of the data queue of the source host. The source host may send, with reference to the foregoing method, a subsequent data packet in the data queue of the source host and a control packet generated by the source host.

In an implementation, when no congestion occurs on the first physical link, the destination host receives the first control packet sent by the source host, and the second control packet is a control packet generated based on the first control packet. In the method provided in this embodiment of this application, S208, S209, S210, and S212 are performed after S205. Considering that the control channel and the data channel are carried on the first physical link in this embodiment of this application, S208 and S209 are performed without affecting S206 and S207. For example, S208 may be performed before S206 or performed simultaneously with S206, and S209 may be performed before S207 or performed simultaneously with S207. In this implementation, the source host receives the fourth control packet after receiving the second control packet, and duration between a moment at which the source host receives the fourth control packet and a moment at which the source host receives the second control packet is the duration t in S208. After receiving the fourth control packet, the source host may send the C data packets in the first data packet set through the data channel. When C is 1, a data packet sent by the source host after the source host receives the fourth control packet is the second data packet. The second data packet is a data packet that is at the head of the data queue of the source host after the first data packet is sent. For a method for transmitting the second data packet on the first physical link, refer to the method for transmitting the first data packet on the first physical link.

In another implementation, when congestion occurs on the control channel on the first physical link, the destination host fails to receive the first control packet sent by the source host. In the method provided in this embodiment of this application, S208, S209, S210, and S212 are performed between S204 and S206, and S205 and S212 are combined into one step S205' (not shown in FIG. 2). The parameter set carried in the second control packet in S205' is a parameter set carried in the fourth control packet in S212. In other words, when a packet loss occurs in the network and the first control packet is discarded, the destination host generates the second control packet in S205' based on the third control packet. If a control packet generated by the source host further includes a sequence number, the first control packet includes the first sequence number, and the third control packet includes a second sequence number. In this implementation, the second control packet in S205' includes the second sequence number. The second sequence number is unequal to the first sequence number. Correspondingly, after receiving the second control packet, the source host determines that the first control packet is discarded, and then learns that congestion may occur on the control channel on the first physical link. The source host may reduce a sending rate of a to-be-sent control packet according to the AIMD algorithm. In the scenario shown in FIG. 1, if the control packet a1 is discarded before being sent to S2, and the control packet a2 is transmitted to S2, S1 sends C data packets corresponding to the control packet a2' after receiving the control packet a2'. In a manner, a sequence number included in the control packet a2' is different from a sequence number included in the control packet a1. S1 may determine, based on the sequence number included in the control packet a2', that the control packet a1 is discarded, and S1 may prolong, according to the AIMD algorithm, an interval for sending the control packet a3. In another manner, S1 may determine, based on the second ECN identifier included in the control packet a2', that congestion may occur on the control channel on the first physical link, and S1 may prolong, according to the AIMD algorithm, an interval for sending the control packet a3.

In addition to the foregoing two manners, when a control packet generated by the source host does not include a sequence number and an ECN identifier, the source host may start a timer after sending the control packet, and determine, after the timer expires, that congestion may occur on the control channel on the first physical link. In this embodiment of this application, the source host may alternatively determine, by using a common congestion determining method, that congestion may occur on the control channel on the first physical link. Examples are not described one by one herein. In the method provided in Embodiment 1 of this application, a control packet transmitted through the control channel is used to detect the congestion status of the first physical link. After receiving any control packet from the destination host, the source host sends, through the data channel, a data packet corresponding to the control packet. A structure in which the control channel and the data channel are carried on the first physical link enables transmission of the control packet not to affect transmission of the data packet, and a loss of the control packet only prolongs an interval of sending the data packet. This helps eliminate a congestion status on the data channel of the link, and a packet loss retransmission operation does not need to be performed during TCP transmission. The intermediate node sends a control packet in the control queue of the intermediate node based on the preset duration, so that the source host sends a subsequent data packet based on a pacing of sending the control packet by the intermediate node.

Embodiment 2

Figure 3:
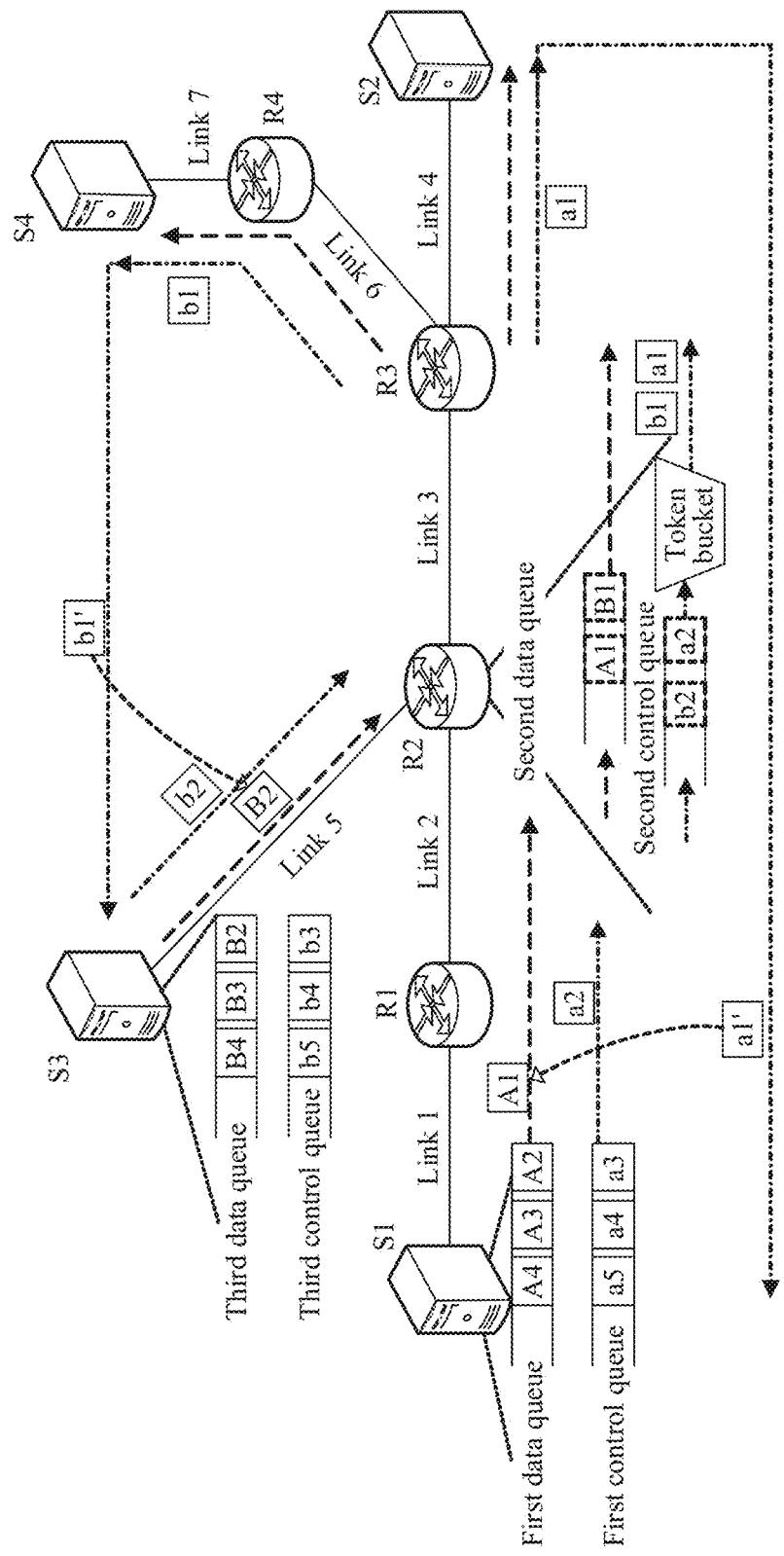
FIG. 3 is a schematic diagram of a scenario according to Embodiment 2 of this application.

FIG. 3 is a schematic diagram of a scenario according to Embodiment 2 of this application. In the scenario provided in Embodiment 2 of this application, S1 represents a first host serving as a transmit end, S2 represents a second host serving as a receive end, S3 represents a third host serving as a transmit end, S4 represents a fourth host serving as a receive end, R1 represents a first forwarding device, R2 represents a second forwarding device, and R3 represents a third forwarding device. A physical link between S1 and S2 is a first physical link. The first physical link includes a link 1 between S1 and R1, a link 2 between R1 and R2, a link 3 between R2 and R3, and a link 4 between R3 and S2. A physical link between S3 and S4 is a second physical link.

The second physical link includes a link 5 between S3 and R2, the link 3 between R2 and R3, a link 6 between R3 and R4, and a link 7 between R4 and S4. The link 3 between R2 and R3 is an overlapping link between the first physical link and the second physical link. A port of the link 1 on S1 includes a first data queue and a first control queue. If S1 does not need to buffer a generated control packet, the port of the link 1 on S1 includes the first data queue. The first data queue is used to store at least one data packet A, and the at least one data packet A includes a data packet A1, a data packet A2, a data packet A3, and a data packet A4. The first control queue is used to store at least one control packet a, and the at least one control packet a includes a control packet a1, a control packet a2, a control packet a3, a control packet a4, and a control packet a5. A port of the link 5 on S3 includes a third data queue and a third control queue. If S3 does not need to buffer a generated control packet, the port of the link 5 on S3 includes the third data queue. The third data queue is used to store at least one data packet B, and the at least one data packet B includes a data packet B1, a data packet B2, a data packet B3, and a data packet B4. The third control queue is used to store at least one control packet b, and the at least one control packet b includes a control packet b1, a control packet b2, a control packet b3, a control packet b4, and a control packet b5. A port of the link 3 on R2 includes a second data queue, a second control queue, and a token bucket. The second data queue is used to store the data packet A from the link 1 and the data packet B from the link 5. The second control queue is used to store the control packet a from the link 1 and the control packet b from the link 5. The token bucket is used to schedule a control packet in the second control queue. R1, R3, and R4 may also use a structure of R2 in FIG. 3. In other words, an egress port of any forwarding device is provided with a data queue, a control queue, and a token bucket. For functions of a data queue, a control queue, and a token bucket provided on each of R1, R3, and R4, refer to corresponding content of R2. The link 3 may be a bottleneck link on the first physical link and the second physical link.

Figure 4A:
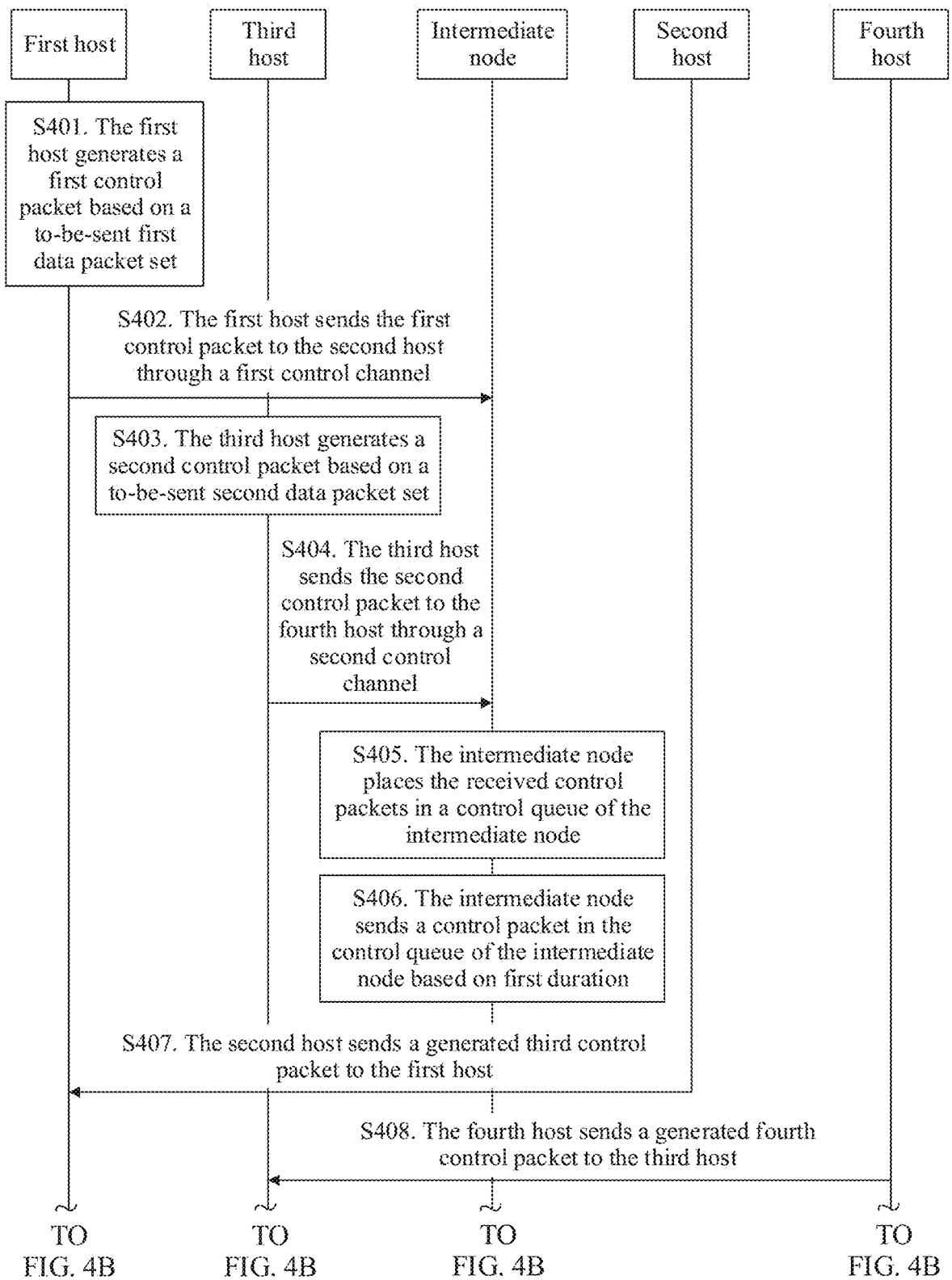
FIG. 4A and FIG. 4B are a schematic flowchart of a method for controlling traffic in a packet-based network according to Embodiment 2 of this application.
Figure 4B:
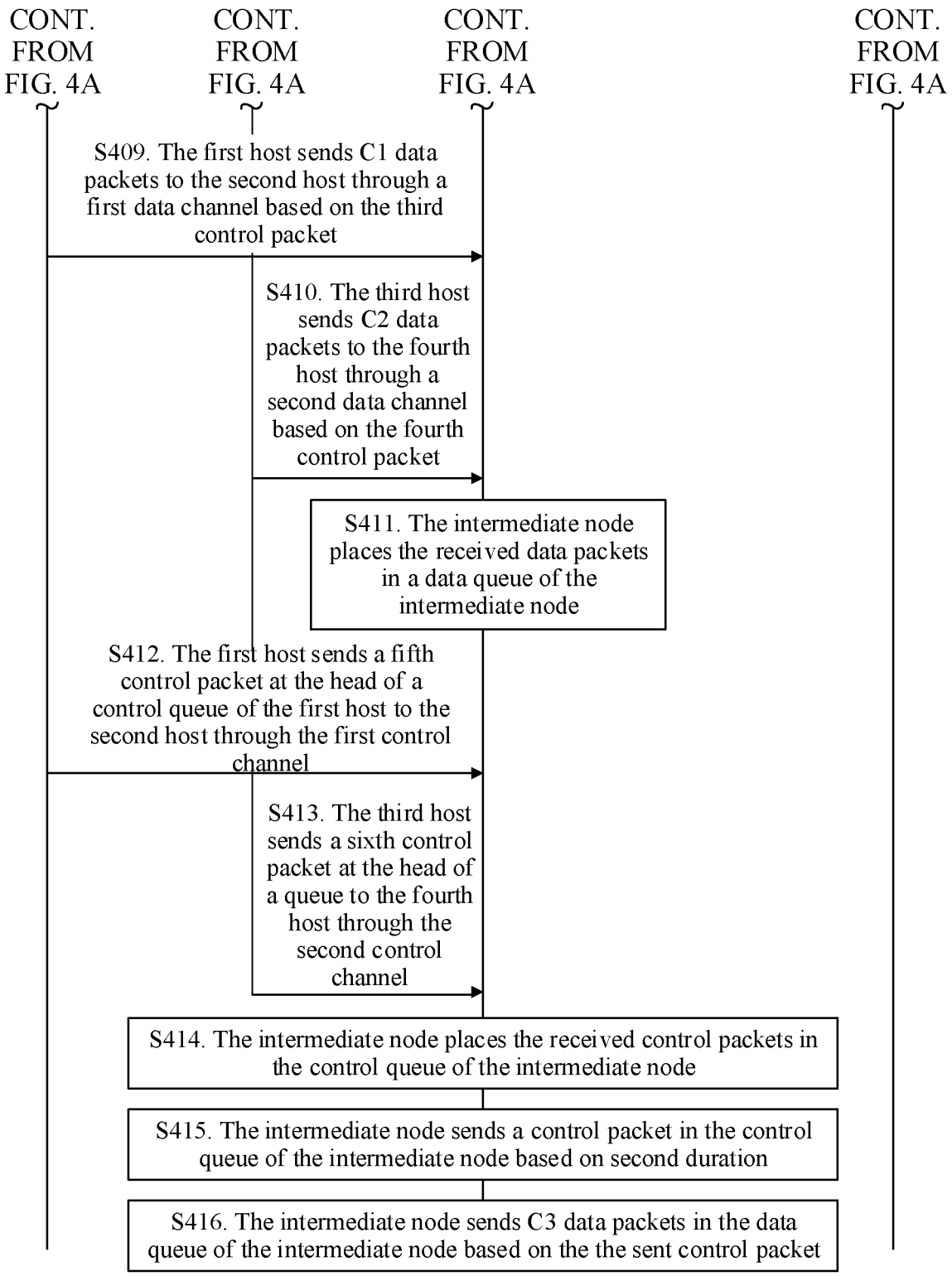

FIG. 4A and FIG. 4B are a schematic flowchart of a method for controlling traffic in a packet-based network according to Embodiment 2 of this application. The method provided in Embodiment 2 may be applied to the scenario shown in FIG. 3. In the method provided in Embodiment 2, for a method in which a first host processes a first data packet set and any control packet, refer to the method used by the source host in Embodiment 1; for a method in which a third host processes a second data packet set and any control packet, refer to the method used by the source host in Embodiment 1; for a method in which a second host processes a received control packet, refer to the method used by the destination host in Embodiment 1; and for a method in which a fourth host processes a received control packet, refer to the method used by the destination host in Embodiment 1. A ratio of a bandwidth of a data channel to a bandwidth of a control channel on any physical link in Embodiment 2 is the same as that in Embodiment 1. With reference to FIG. 3, and FIG. 4A and FIG. 4B, the following describes the method for controlling traffic in a packet-based network according to Embodiment 2 of this application.

S401. The first host generates a first control packet based on the to-be-sent first data packet set.

For a method in which the first host generates the first control packet in S401, refer to the method used by the source host in S201. The first data packet set includes a first data packet and a second data packet. In the scenario shown in FIG. 3, S1 is S1 in the scenario in FIG. 1, the control packet a1 is the first control packet, and the data packet A1 is the first data packet. In an initial phase of S1, the control packet a1 is at the head of the first control queue, and the data packet A1 is at the head of the first data queue. The initial phase of S1 is a phase in which S1 does not send any data packet or any control packet.

S402. The first host sends the first control packet to the second host through a first control channel.

For a method in which the first host sends the first control packet in S402, refer to the method used by the source host in S202. In Embodiment 2, the first host is a transmit end on a first physical link, and the second host is a receive end on the first physical link. The first physical link is a physical link between the first host and the second host. In the scenario shown in FIG. 3, S2 may be S2 in the scenario shown in FIG. 1.

In Embodiment 2, a sequence of performing S403 and S404 is not limited to the following sequence. In an implementation, S403 may be performed at the same time as S401, and S404 is performed after S402. In another implementation, S403 may be performed before S401, and S404 is performed after S402.

S403. The third host generates a second control packet based on the to-be-sent second data packet set.

To be distinguished from the data packets included in the first data packet set, the second data packet set includes a third data packet and a fourth data packet. The third data packet is a data packet that ranks first in the second data packet set, and the third data packet is at the head of a data queue of the third host. The fourth data packet is a data packet that ranks second in the second data packet set, and the fourth data packet is immediately adjacent to the third data packet in the data queue of the third host. For a method in which the third host generates the second control packet, refer to corresponding content in S201 in Embodiment 1. In an IP network, any two data packets in the second data packet set include a same 5-tuple. The second data packet set and the first data packet set belong to different traffic flows.

In an implementation, the third host may add an identifier to the generated second control packet, and the identifier is used to identify that a packet in which the identifier is located is a control packet. Therefore, an intermediate node and a destination host that receive the second control packet can distinguish between the second control packet and any data packet in the second data packet set based on the identifier. In the IP network, the identifier may be implemented by using one or more specific bits in a TOS field or a DSCP field in a packet header of the second control packet.

In the scenario shown in FIG. 3, the second data packet set includes the data packet B1, the data packet B2, the data packet B3, and the data packet B4. In an initial phase of S3, the third data queue includes the data packet B1, the data packet B2, the data packet B3, and the data packet B4, and the third control queue includes the control packet b1, the control packet b2, the control packet b3, the control packet b4, and the control packet b5. The initial phase of S3 is a phase in which S3 does not send any data packet or any control packet. The data packet B1 is a data packet at the head of the third data queue. The data packet B1 is the third data packet, and the data packet B2 is the fourth data packet. The control packet b1 is the second control packet, and the control packet b1 is a control packet at the head of the third control queue. A manner of calculating a ratio of a bandwidth of a data channel to a bandwidth of a control channel on S3 is the same as that in Embodiment 1.

S404. The third host sends the second control packet to the fourth host through a second control channel.

In Embodiment 2, the third host is a transmit end on a second physical link, and the fourth host is a receive end on the second physical link. The second physical link is a physical link between the third host and the fourth host. The second control packet sent by the third host is sent to the fourth host hop by hop by using an intermediate node on the second physical link. In the scenario shown in FIG. 3, S3 may send the control packet b1 by using the port (an egress port) connected to the link 5, and the control packet b1 is sent to R2 through the link 5. In a phase in which S3 sends the control packet b1, the third data queue includes the data packet B1, the data packet B2, the data packet B3, and the data packet B4. After the control packet b1 is sent, the control packet b2 is at the head of the third control queue.

S405. The intermediate node places the received control packets in a control queue of the intermediate node.

For example, the control packets received by the intermediate node include the first control packet and the second control packet. The first control packet is an initial control packet from the first host, and the second control packet is an initial control packet from the third host. The intermediate node places the first control packet and the second control packet in the control queue of the intermediate node in a sequence in which the first control packet and the second control packet arrive at the intermediate node. In Embodiment 2, the intermediate node is the first node at which the first physical link and the second physical link overlap, for example, R2 in FIG. 3. An overlapping link between the first physical link and the second physical link may include a bottleneck link. In the scenario shown in FIG. 3, R2 is an upstream node on the bottleneck link, and R3 may use the structure of R2 in FIG. 3. R1 and R4 may use the structure of R2 in FIG. 1. In the scenario shown in FIG. 3, the control packet a1 is at the head of the second control queue, the control packet b1 is immediately adjacent to the control packet a1 in the second control queue, and control packets subsequently received by R2 through the link 5 and the link 2 are all placed in the second control queue in a receiving sequence.

S406. The intermediate node sends a control packet in the control queue of the intermediate node based on first duration.

For example, for a method for calculating the first duration, refer to the method for calculating the preset duration in Embodiment 1. The first control packet is at the head of the control queue of the intermediate node, and the second control packet is immediately adjacent to the first control packet in the control queue of the intermediate node. A token bucket provided on an egress port of the intermediate node sends the control packet in the control queue of the intermediate node based on the first duration. In this case, no data packet is buffered in a data queue of the intermediate node. Therefore, the intermediate node does not send any data packet. When a CBS is 84 bytes and a CIR is 500 Mbps, the first duration is 1.344 us. In the scenario shown in FIG. 3, the token bucket on R2 sends one control packet in the second control queue at an interval of 1.344 us, and an interval between a moment of sending the control packet a1 and a moment of sending the control packet b1 is 1.344 us. Therefore, in the packet-based network, a sending pacing of C1 data packets of which subsequent sending is triggered by the control packet a1 is consistent with a sending pacing of C2 data packets of which subsequent sending is triggered by the control packet b1, so that a link delay in the packet-based network is mainly a forwarding delay. This reduces a buffer delay.

For example, a first round trip time (RTT) is duration from a moment at which the intermediate node (the upstream node on the bottleneck link) sends a control packet through the first physical link to a moment at which the intermediate node receives, through the first physical link, a data packet of which sending is triggered by the control packet. A control packet sent through the first physical link is a control packet generated by the first host, and a data packet received through the first physical link is a data packet (a data packet in the first data packet set) buffered by the first host. The second RTT is duration from a moment at which the intermediate node (the upstream node on the bottleneck link) sends a control packet through the second physical link to a moment at which the intermediate node receives, through the second physical link, a data packet of which sending is triggered by the control packet. A control packet sent through the second physical link is a control packet generated by the third host, and a data packet received through the second physical link is a data packet (a data packet in the second data packet set) buffered by the third host.

When the first RTT is equal to the second RTT, an interval between a moment of sending a data packet that is triggered by the control packet a1 and a moment of sending a data packet that is triggered by the control packet b1 is 1.344 us in the entire network. Because an interval between a moment at which the data packet A1 of which sending is triggered by the control packet a1 arrives at R2 and a moment at which the data packet B1 of which sending is triggered by the control packet b1 arrives at R2 is greater than or equal to 1.344 us, no time sequence conflict occurs.

S407. The second host sends a generated third control packet to the first host.

For a method in which the second host generates the third control packet, refer to the method in which the destination host generates the second control packet in Embodiment 1. For a method in which the second host sends the third control packet, refer to the method in which the destination host sends the second control packet in Embodiment 1. In the scenario shown in FIG. 3, a control packet a1' is the third control packet. For a method in which S2 generates and sends the control packet a1', refer to the method in which S2 generates and sends the control packet a1' in Embodiment 1.

S408. The fourth host sends a generated fourth control packet to the third host.

For a method in which the fourth host generates the fourth control packet, refer to the method in which the destination host generates the second control packet in Embodiment 1. For a method in which the fourth host sends the fourth control packet, refer to the method in which the destination host sends the second control packet in Embodiment 1. In the scenario shown in FIG. 3, a control packet b1' is the fourth control packet, and S4 receives the control packet b1 through the link 7. For a method in which R4 processes the control packet b1, refer to the method in which R2 processes the control packet a1 in Embodiment 1. For a method in which S4 generates the control packet b1', refer to the method in which S2 generates the control packet a1' in Embodiment 1.

S409. The first host sends C1 data packets to the second host through a first data channel based on the third control packet.

For example, for a specific method in S409, refer to corresponding content in S206 in Embodiment 1, and C1 may be equal to C in Embodiment 1. In the scenario shown in FIG. 3, S1 receives the control packet a1' from S2, and S1 determines that the control packet a1' corresponds to a data packet in the first data queue. S1 may determine, by using the method used by S1 in Embodiment 1, that the control packet a1' corresponds to a data packet in the first data queue, and S1 sends C1 data packets in the first data queue by using the port connected to the link 1. When C1 is 1, S1 sends the data packet A1 through the link 1, and the data packet A1 is the first data packet. After the data packet A1 is sent, the data packet A2 is at the head of the first data queue. The data packet A1 is sent to R2 through a path: link 1→R1→link 2. When C1 is 3, S1 sends the data packet A1, the data packet A2, and the data packet A3 through the link 1. The data packet A1, the data packet A2, and the data packet A3 may be sent to R2 through the path: link 1→R1→link 2. After the data packet A1, the data packet A2, and the data packet A3 are sent, the data packet A4 is at the head of the first data queue.

S410. The third host sends C2 data packets to the fourth host through a second data channel based on the fourth control packet.

For example, for a specific method in S410, refer to the method used by the source host in S206 in Embodiment 1, and C2 may be equal to C in Embodiment 1. In the scenario shown in FIG. 3, S3 receives the control packet b1' from S4, and S3 determines that the control packet b1' corresponds to a data packet in the third data queue. S3 may determine, by using the method used by S1 in Embodiment 1, that the control packet b1' corresponds to a data packet in the third data queue, and S3 sends the C2 data packets in the third data queue by using the port connected to the link 5. When C2 is 1, S1 sends the data packet B1 through the link 5, and the data packet B1 is the third data packet. After the data packet B1 is sent, the data packet B2 is at the head of the third data queue. The data packet B1 is sent to R2 through the link 5. When C2 is 3, S1 ends the data packet B1, the data packet B2, and the data packet B3 through the link 5. The data packet B1, the data packet B2, and the data packet B3 may be sent to R2 through the link 5. After the data packet B1, the data packet B2, and the data packet B3 are sent, the data packet B4 is at the head of the third data queue.

S411. The intermediate node places the received data packets in the data queue of the intermediate node.

For example, the data packets received by the intermediate node include the C1 data packets and the C2 data packets. When the data queue of the intermediate node is empty, the intermediate node places the C2 data packets at the head of the data queue of the intermediate node and places the C1 data packets at the tail of the data queue of the intermediate node in a sequence of receiving the C1 data packets and the C2 data packets. The C1 data packets are immediately adjacent to the C2 data packets in the data queue of the intermediate node. The reason why the C2 data packets arrive at the intermediate node before the C1 data packets is that the first RTT is unequal to the second RTT, for example, that the second RTT is less than the first RTT. When the first RTT is equal to the second RTT, and both C1 and C2 are 1, the C1 data packets arrive at the intermediate node before the C2 data packets. In this case, no packet accumulation occurs in the data queue of the intermediate node. Data packet accumulation mentioned in this embodiment of this application is mainly caused by a time sequence conflict. For another type of packet accumulation, not limitation is imposed in this embodiment of this application.

When the first RTT is unequal to the second RTT, a time sequence conflict may occur when the C1 data packets sent from the first data packet set and the C2 data packets sent from the second data packet set arrive at the bottleneck link. For example, when both C1 and C2 are 1, an interval between a moment at which the third data packet may arrive at the intermediate node and a moment at which the first data packet may arrive at the intermediate node is less than 1.344 us, and consequently a time sequence conflict occurs. In the scenario shown in FIG. 3, the first RTT is unequal to the second RTT, both C1 and C2 are 1, the data packet B1 is at the head of the second data queue, the data packet A1 is adjacent to the data packet B1 in the second data queue, and the control packet a1 is sent before the control packet b1. When the first RTT is equal to the second RTT, the C1 data packets arrive at R2 before the C2 data packets. When the first RTT is greater than the second RTT, the C1 data packets arrive at R2 after the C2 data packets.

S412. The first host sends a fifth control packet at the head of a control queue of the first host to the second host through the first control channel.

S412 is performed after S402. The fifth control packet is the third control packet in Embodiment 1. For a specific method in S412, refer to corresponding content in S208 in Embodiment 1. In the scenario shown in FIG. 3, the control packet a2 is the fifth control packet.

S413. The third host sends a sixth control packet at the head of a control queue of the third host to the fourth host through the second control channel.

S413 is performed after S404. For a method in which the third host sends the sixth control packet, refer to the method in which the source host sends the third control packet in S208 in Embodiment 1. In the scenario shown in FIG. 3, the control packet b2 is the sixth control packet.

S414. The intermediate node places the received control packets in the control queue of the intermediate node.

In S414, the control packets received by the intermediate node include the fifth control packet and the sixth control packet. For a method in which the intermediate node processes the fifth control packet and the sixth control packet, refer to corresponding content in S405. In the scenario shown in FIG. 3, the control packet a2 and the control packet b2 are sent to R2 through different links. In a receiving sequence, R2 places the control packet a2 in a corresponding location indicated by a dashed line in the second control queue, and places the control packet b2 in a corresponding location indicated by a dashed line in the second control queue.

S415. The intermediate node sends a control packet in the control queue of the intermediate node based on second duration.

For example, when there is no RTT network noise, the second duration may be the first duration in S406. The intermediate node may send a packet in the control queue of the intermediate node by using the method in S406. When there is RTT network noise, the intermediate node may adjust the second duration based on a buffer status of the data queue of the intermediate node. The RTT network noise means that a plurality of traffic flows carried on one bottleneck link have different RTTs. The RTT network noise is caused by the following factors: a fiber link length difference, an in-device logic processing time difference, an in-device memory difference, and a path hop count difference. The RTT network noise causes a time sequence conflict when data packets of different traffic flows carried on different paths arrive at a bottleneck link. For example, the first RTT is unequal to the second RTT.

It is assumed that the first RTT is equal to the second RTT, and an AIMD algorithm used in the network can implement absolute fairness. The absolute fairness means that control packets in the second control queue are arranged alternately between the control packet a and the control packet b. For example, control packets received by R2 may be arranged as follows: control packet a1→control packet b1→control packet a2→control packet b2→control packet a3→control packet b3→control packet a4→control packet b4→control packet a5→control packet b5. Correspondingly, data packets in the second data queue are arranged alternately between the data packet A and the data packet B. For example, data packets received by R2 may be arranged as follows: data packet A1→data packet B1→data packet A2→data packet B2→data packet A3→data packet B3→data packet A4→data packet B4. After sending the control packet a2, R2 correspondingly sends C3 data packets in the second data queue, and C3 is equal to C1. When C3 is 1, after sending the control packet a2, R2 correspondingly sends a data packet at the head of the second data queue. After sending the control packet a2, R2 sends the control packet b2 based on the second duration. After sending the control packet b2, R2 correspondingly sends C3 data packets in the second data queue. In this way, when C3 is 1, no packet accumulation occurs in the second data queue.

If the first RTT is unequal to the second RTT, in the scenario shown in FIG. 3, a packet at the head of the second data queue is the data packet B1, and a packet at the head of the second control queue is the control packet a2. If the token bucket of R2 still sends the control packet a2 by using the first duration in S406, data packet accumulation may occur in the second data queue because a time sequence conflict may occur when data packets arrive at the second data queue.

To alleviate data packet accumulation caused by the RTT network noise, the intermediate node may calculate the second duration by using the following method. The method specifically includes: When a sum of packet lengths of data packets accumulated in the data queue of the intermediate node is greater than a first threshold and is less than a second threshold, the intermediate node decreases a CIR used for calculating the first duration, to obtain the second duration. The second duration is greater than the first duration, and the accumulated data packets indicate buffered data packets. Therefore, the intermediate node prolongs an interval of sending a control packet, a period of sending the first data packet set by the first host is prolonged, and a period of sending the second data packet set by the third host is prolonged. The first threshold may be a % of a maximum value of a sum of packet lengths of data packets that can be buffered in the data queue, where a % may be greater than or equal to 10% and less than or equal to 20%. The second threshold may be determined based on a size of a buffer space of the intermediate node. Specifically, the second threshold may be a maximum value of a sum of packet lengths of data packets that can be buffered in the buffer space of the intermediate node. In a data center network scenario, a switch (that is, a switch serving as the intermediate node) in a data center has a relatively small buffer, and the first threshold may be a quantity of data packets. For example, the first threshold may be L data packets, and L is an integer that ranges from 8 to 10. In the data center network scenario, the second threshold may be a maximum value of a quantity of data packets that can be buffered in the buffer space of the intermediate node. An interval at which the intermediate node receives a new data packet is prolonged. This helps reduce a quantity of data packets that arrive at the intermediate node within a specific period, and helps eliminate data packet accumulation.

To reduce excessive deceleration caused by eliminating data packet accumulation, so that no data packet in the second data queue can be sent, the intermediate node may calculate third duration by using the following method, and use the calculated third duration as the second duration used by the intermediate node in S415. The method specifically includes: When duration in which the data queue of the intermediate node is in an idle state reaches a third threshold, the intermediate node increases a CIR used for calculating the first duration, to obtain the third duration. The third duration is less than the first duration. When the CIR is increased to a maximum bandwidth of a third control channel, the intermediate node no longer increases the CIR. The third control channel is a control channel of the intermediate node. The third threshold is related to a minimum RTT in the packet-based network. The third threshold may range from 1 μs to 5 μs. For example, the third threshold is less than the minimum RTT in the packet-based network. Therefore, the intermediate node shortens a sending interval of a control packet, a period of sending the first data packet set by the first host is shortened, a period of sending the second data packet set by the third host is shortened, and an interval at which the intermediate node receives a new data packet is shortened. This helps improve link bandwidth utilization.

S416. The intermediate node sends C3 data packets in the data queue of the intermediate node based on the sent control packet.

For a specific method in S416, refer to the method in S211 in Embodiment 1. Herein, C3 is equal to C in Embodiment 1, and C3 is equal to C1 or C2. In the scenario shown in FIG. 3, after R2 sends the control packet a2, R2 sends the C3 data packets in the second data queue. When C3 is 1, R2 sends the data packet B1. When C3 is 2, R2 sends the data packet B1 and the data packet A1.

After S416, the second host and the fourth host each may process a received control packet by using the method provided in Embodiment 1. The first host, the third host, the intermediate node, the second host, and the fourth host provided in Embodiment 2 of this application each may perform, by using the corresponding method provided in Embodiment 1, AIMD algorithm processing on a corresponding control packet when a packet loss or congestion occurs on a control channel of a link. This implements fairness between traffic flows. In Embodiment 2, a method in which the intermediate node dynamically adjusts the second duration may also be applied to Embodiment 1 in which the intermediate node adjusts the first duration. In other words, the intermediate node in Embodiment 1 may use the foregoing method to reduce a possibility of data packet accumulation.

In the method provided in Embodiment 2 of this application, the intermediate node can dynamically adjust, based on a buffer status of a data packet in the data queue of the intermediate node, a period of sending a control packet by the token bucket, to control a period of sending a data packet by the first host and a period of sending a data packet by the third host. This can effectively alleviate congestion that may occur in a data packet transmission process, reduce a transmission delay, and improve link bandwidth utilization.

Embodiment 3

Figure 5:
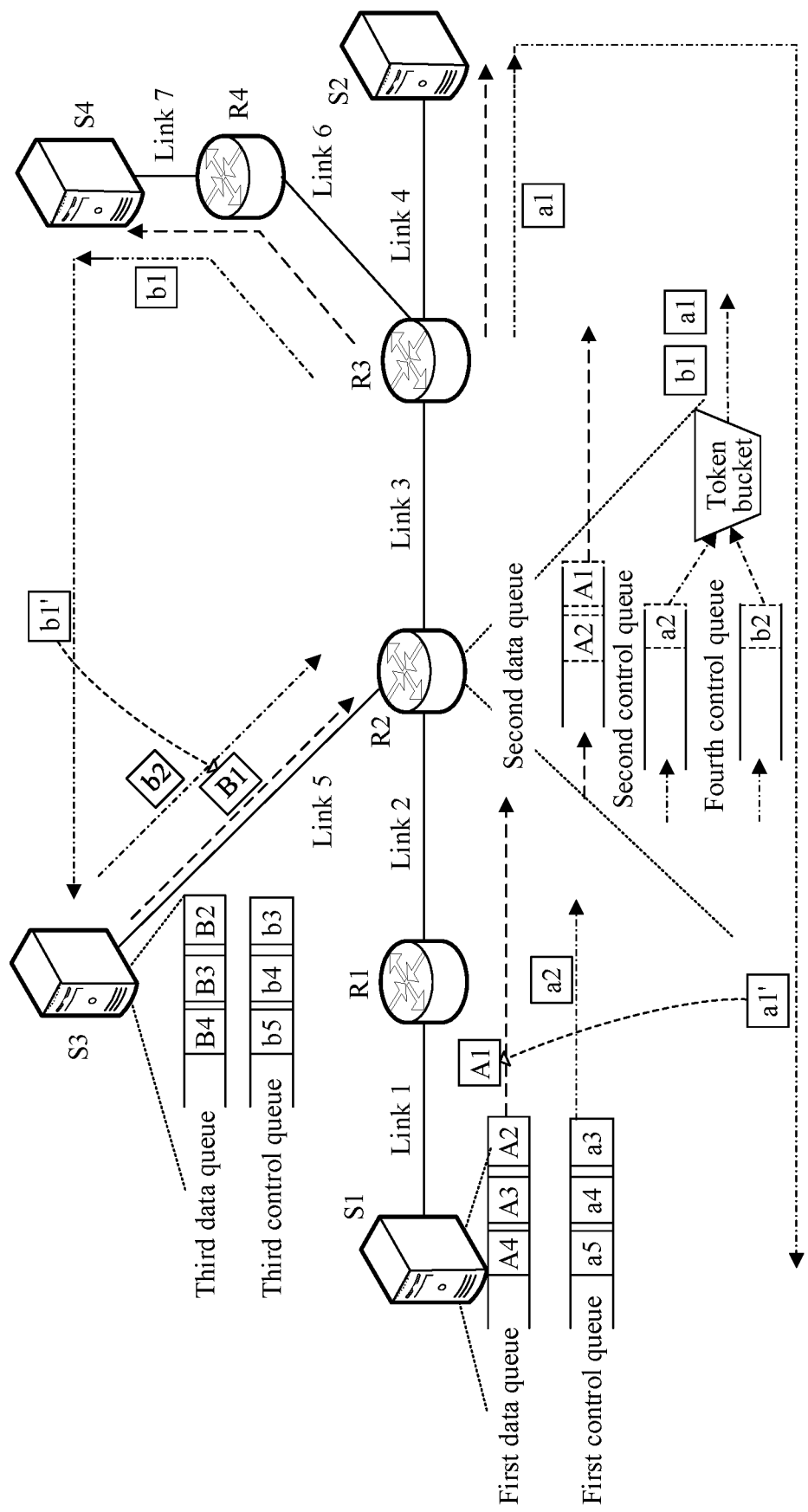
FIG. 5 is a schematic diagram of a scenario according to Embodiment 3 of this application.

FIG. 5 is a schematic diagram of a scenario according to Embodiment 3 of this application. In the scenario provided in Embodiment 3 of this application, R2 in Embodiment 2 is optimized based on the scenario provided in Embodiment 2. In Embodiment 3, a port of a link 3 on R2 includes a second data queue, a second control queue, a fourth control queue, and a token bucket. The second data queue is used to store a data packet A from a link 2 and a data packet B from a link 5. The second control queue is used to store a control packet a from the link 2. The fourth control queue is used to store a control packet b from the link 5. The token bucket is configured to schedule the control packet a in the second control queue and the control packet b in the fourth control queue. For devices and links in Embodiment 3 that are the same as those in Embodiment 2, refer to corresponding descriptions in Embodiment 2.

Figure 6A:
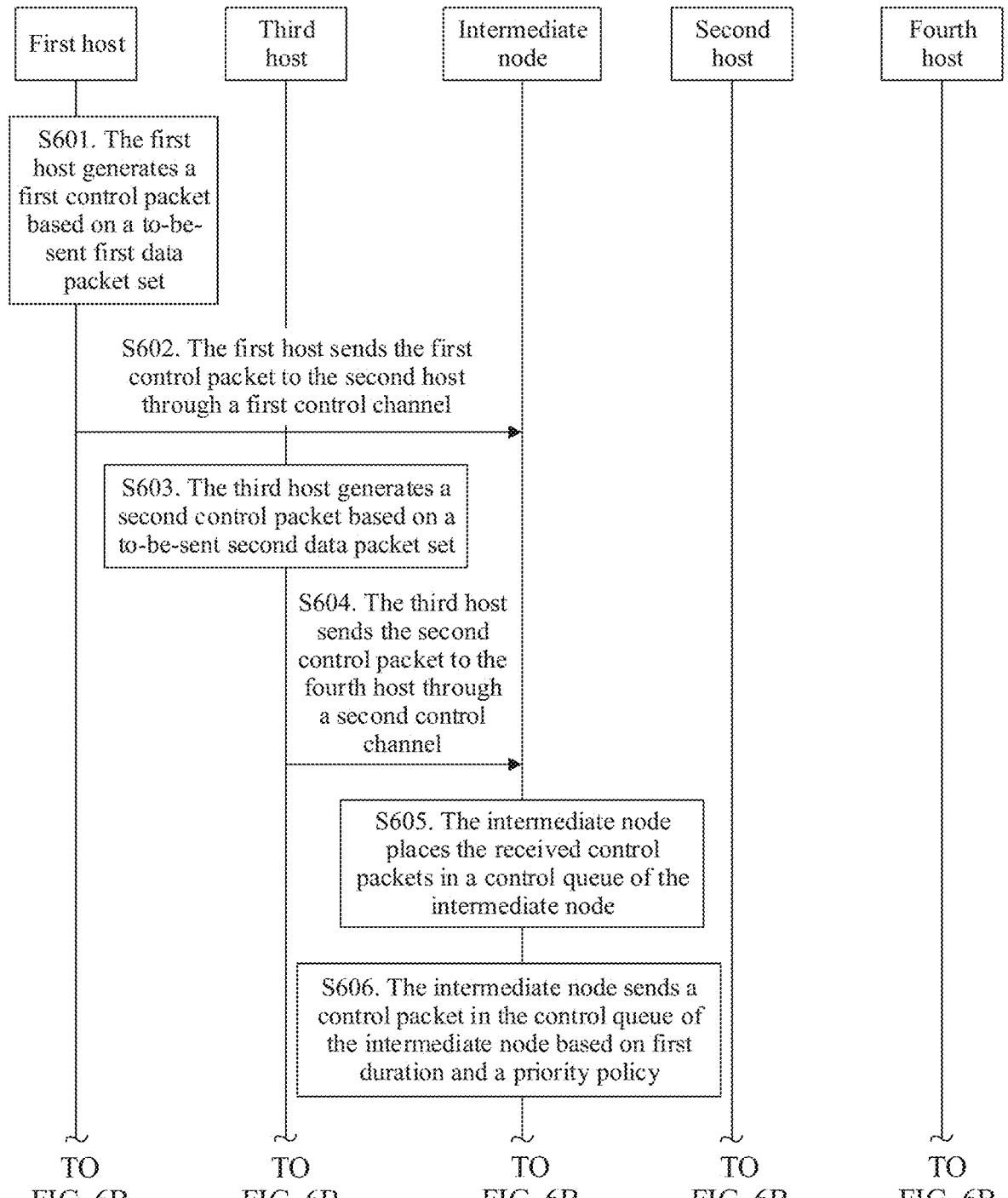
FIG. 6A and FIG. 6B are a schematic flowchart of a method for controlling traffic in a packet-based network according to Embodiment 3 of this application.
Figure 6B:
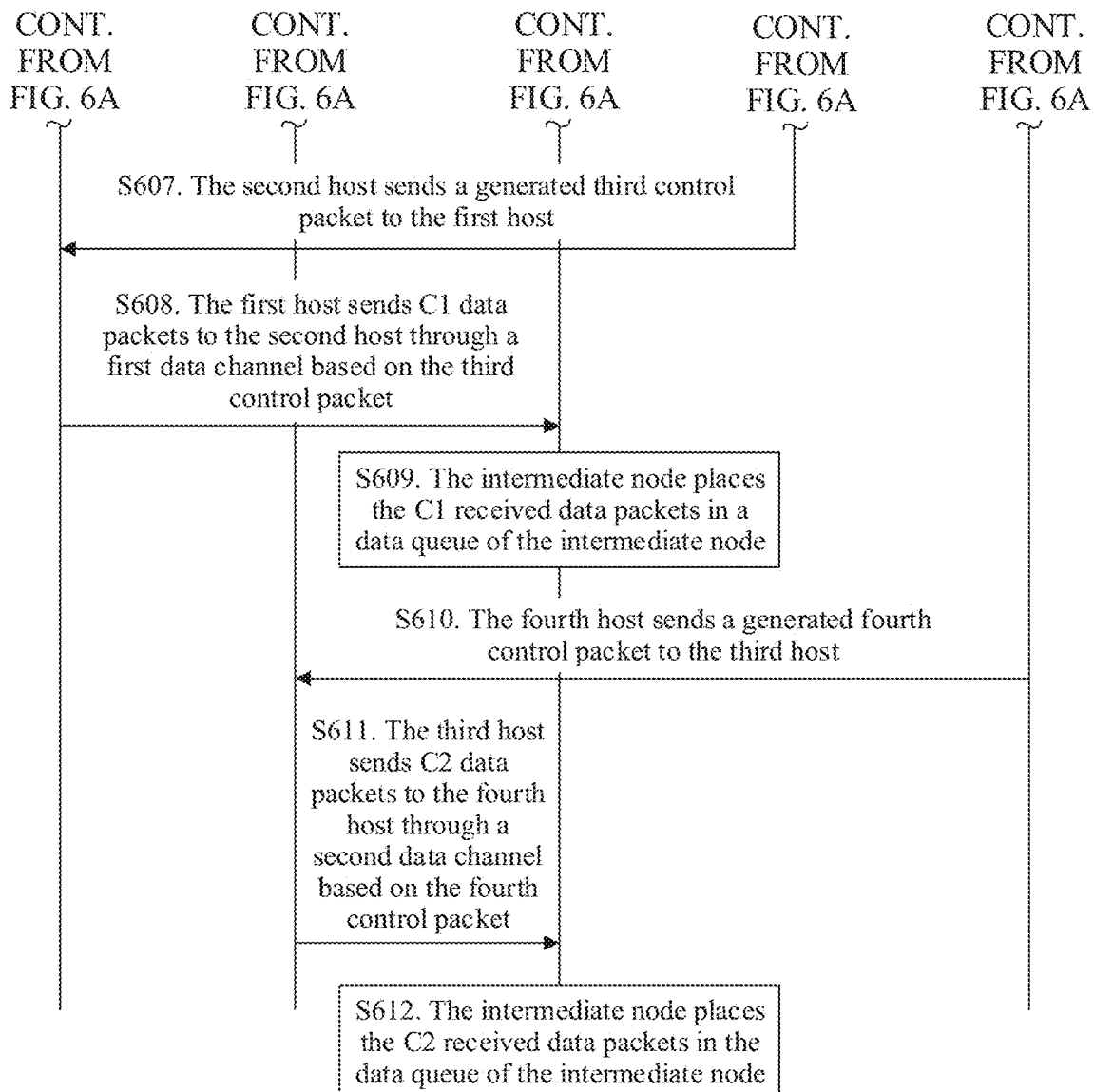

FIG. 6A and FIG. 6B are a schematic flowchart of a method for controlling traffic in a packet-based network according to Embodiment 3 of this application. The method provided in Embodiment 3 may be applied to the scenario shown in FIG. 5. An intermediate node in Embodiment 3 may dynamically adjust a sending period of a buffered control packet by using the method in Embodiment 2. The intermediate node in Embodiment 3 may further perform optimized scheduling for a traffic flow having a special requirement. A first traffic flow in Embodiment 3 may be a mice flow in a data center scenario. The mice flow is characterized by a relatively small amount of data transmitted each time and intermittent sending. A second traffic flow in Embodiment 3 may be an elephant flow in the data center scenario. The elephant flow may be a traffic flow or a data packet set mentioned in Embodiment 1 or Embodiment 2. A ratio of a bandwidth of a data channel to a bandwidth of a control channel on any physical link in Embodiment 3 is the same as that in Embodiment 1 or Embodiment 2. With reference to FIG. 5, and FIG. 6A and FIG. 6B, the following describes the method for controlling traffic in a packet-based network according to Embodiment 3 of this application.

S601. A first host generates a first control packet based on a to-be-sent first data packet set.

For a method in which the first host generates the first control packet in S601, refer to corresponding content in S401. The first data packet set includes a first data packet and a second data packet. In the scenario shown in FIG. 5, S1 is S1 in the scenario in FIG. 1, S1 includes a first data queue and a first control queue, a control packet a1 is the first control packet, and a data packet A1 is the first data packet. In an initial phase of S1, the control packet a1 is at the head of the first control queue, and the data packet A1 is at the head of the first data queue. The initial phase of S1 is a phase in which S1 does not send any data packet or any control packet.

S602. The first host sends the first control packet to a second host through a first control channel.

For a method in which the first host sends the first control packet in S602, refer to corresponding content in S402. In Embodiment 3, the first host is a transmit end on a first physical link, and the second host is a receive end on the first physical link. The first physical link is a physical link between the first host and the second host. In the scenario shown in FIG. 5, S2 may be S2 in the scenario in FIG. 1.

In Embodiment 3, a sequence of performing S603 and S604 is not limited to the following sequence. In an implementation, S603 may be performed at the same time as S601, and S604 is performed after S602. In another implementation, S603 may be performed before S601, and S604 is performed after S602.

S603. A third host generates a second control packet based on a to-be-sent second data packet set.

To be distinguished from the data packets included in the first data packet set, the second data packet set includes a third data packet and a fourth data packet. The third data packet is a data packet that ranks first in the second data packet set, and the third data packet is at the head of a data queue of the third host. The fourth data packet is a data packet that ranks second in the second data packet set, and the fourth data packet is immediately adjacent to the third data packet in the data queue of the third host. For a specific method in S603, refer to corresponding content in S403. In the scenario shown in FIG. 5, S3 includes a third control queue and a third data queue. In an initial phase of S3, a data packet B1 is a data packet at the head of the third data queue. The data packet B1 is the third data packet, and a data packet B2 is the fourth data packet. A control packet b1 is the second control packet, and the control packet b1 is a control packet at the head of the third control queue. The initial phase of S3 is a phase in which S3 does not send any data packet or any control packet.

S604. The third host sends the second control packet to a fourth host through a second control channel.

In Embodiment 3, the third host is a transmit end on a second physical link, and the fourth host is a receive end on the second physical link. The second physical link is a physical link between the third host and the fourth host. The second control packet sent by the third host is sent to the fourth host hop by hop by using the intermediate node on the second physical link. For a specific method in S604, refer to corresponding content in S404. In the scenario shown in FIG. 5, S3 may send the control packet b1 by using a port connected to the link 5, and the control packet b1 is sent to R2 through the link 5. After the control packet b1 is sent, a control packet b2 is at the head of the third control queue.

S605. The intermediate node places the received control packets in a control queue of the intermediate node.

For example, the control packets received by the intermediate node include the first control packet and the second control packet. The first control packet is an initial control packet from the first host, and the second control packet is an initial control packet from the third host. The intermediate node includes one data queue and two control queues. The two control queues include a control queue corresponding to the first traffic flow and a control queue corresponding to the second traffic flow. The intermediate node places the first control packet in the control queue corresponding to the first traffic flow, and the intermediate node places the second control packet in the control queue corresponding to the second traffic flow. In Embodiment 3, the intermediate node is the first node at which the first physical link and the second physical link overlap, for example, R2 in FIG. 5. In the scenario shown in FIG. 5, R3 may use a same structure as R2, R1 may use the structure of R2 in FIG. 1, and R4 may also use the structure of R2 in FIG. 1. In the scenario shown in FIG. 5, R2 includes the second data queue, the second control queue, and the fourth control queue. The control packet a1 is placed at the head of the second control queue, the control packet b1 is placed at the head of the fourth control queue, and control packets subsequently received by R2 through the link 5 and the link 2 are all placed in corresponding control queues based on types of traffic flows corresponding to the control packets. The type of the traffic flow means whether the traffic flow is an elephant flow or a mice flow. The second control queue corresponds to the first traffic flow. In other words, the data packet A1 is a data packet of the mice flow. The fourth control queue corresponds to the second traffic flow. In other words, the data packet B1 is a data packet of the elephant flow.

S606. The intermediate node sends a control packet in the control queue of the intermediate node based on first duration and a priority policy.

In Embodiment 3, the intermediate node compares priorities of packets at the head of the two control queues, and reads a control packet according to the priority policy. The priority policy may be a PQ policy or a WFQ policy. The PQ policy is to preferentially read a control packet with a higher priority. The WFQ policy is to read K2 control packets with lower priorities after K1 control packets with higher priorities are preferentially read, where K1 and K2 are integers greater than 1, and K1 is greater than K2. In Embodiment 3, "higher priority" and "lower priority" are relative concepts. To be specific, the first control packet has a higher priority relative to the second control packet, and the second control packet has a lower priority relative to the first control packet. The intermediate node periodically sends a control packet based on the first duration. In Embodiment 3, a priority of the first traffic flow is higher than a priority of the second traffic flow. The intermediate node may determine, based on a priority identifier carried in a control packet, that a priority of the first control packet is higher than a priority of the second control packet. In an IP network, the priority identifier may be carried in a TOS field of the first control packet and the second control packet, or the priority identifier may be carried in a DSCP field of the first control packet and the second control packet. For a method in which the intermediate node sends a read control packet based on the first duration, refer to corresponding content in S204 in Embodiment 1 or S406 in Embodiment 2. A control channel of the intermediate node is a third control channel, and a total bandwidth of the third control channel is a CIR of a token bucket.

In the scenario shown in FIG. 5, the token bucket on R2 sends, at an interval of 1.344 us, a control packet that is read from the second control queue. After reading a control packet from the second control queue, the token bucket reads a next control packet according to the PQ policy or the WFQ policy. In this way, a control packet in the fourth control queue can be sent only after K1 control packets in the second control queue are sent, and R2 sends a control packet in the second control queue again after sending K2 control packets in the fourth control queue.

S607. The second host sends a generated third control packet to the first host.

For a specific method in S607, refer to S407. In the scenario shown in FIG. 5, a control packet a1' is the third control packet. For a method in which S2 generates the control packet a1', refer to corresponding content in Embodiment 2.

S608. The first host sends C1 data packets to the second host through a first data channel based on the third control packet.

For a specific method in S608, refer to corresponding content in S409 in Embodiment 2. In the scenario shown in FIG. 5, S1 receives the control packet a1' from S2, and S1 determines that the control packet a1' corresponds to a data packet in the first data queue. S1 may determine, by using the method used by S1 in Embodiment 1, that the control packet a1' corresponds to a data packet in the first data queue. When C1 is 1, S1 sends the data packet A1 by using a port connected to the link 1. After the data packet A1 is sent, a data packet A2 becomes a data packet at the head of the first data queue. The data packet A1 is sent to R2 through a path: link 1→R1→link 2.

S609. The intermediate node places the C1 received data packets in the data queue of the intermediate node.

For a specific method in S609, refer to S207 in Embodiment 1. A data channel of the intermediate node is a third data channel. The intermediate node may send C3 data packets through the third data channel, where C3 is equal to C3 in Embodiment 2. In the scenario shown in FIG. 5, when C1 is 1, R2 places the data packet A1 at the head of the second data queue, and places the subsequently received data packet A2 at a location immediately adjacent to that of the data packet A1 in the second data queue.

In Embodiment 3, because the intermediate node in S606 preferentially sends a control packet in the control queue corresponding to the first traffic flow, the intermediate node receives, within a period of time, a data packet sent by only the first host. In Embodiment 3, with reference to the methods in S208 to S212 in Embodiment 1, the first host, the intermediate node, and the second host may send a data packet of the first traffic flow and a control packet corresponding to the data packet, and details are not described herein again.

When the intermediate node in S606 further sends a control packet in the control queue corresponding to the second traffic flow, the method provided in Embodiment 3 further includes S610 to S612, and S610 to S612 are performed after S609.

S610. The fourth host sends a generated fourth control packet to the third host.

For a specific method in S610, refer to S408. In the scenario shown in FIG. 5, a control packet b1' is the fourth control packet. S4 receives the control packet b1 through a link 7. For a method in which R4 processes the control packet b1, refer to corresponding content in Embodiment 2. For a method in which S4 generates and sends the control packet b1', refer to corresponding content in Embodiment 2.

S611. The third host sends C2 data packets to the fourth host through a second data channel based on the fourth control packet.

For a specific method in S611, refer to S410 in Embodiment 2. In the scenario shown in FIG. 5, S3 receives the control packet b1' from S4, and S3 determines that the control packet b1' corresponds to a data packet in the third data queue. S3 may determine, by using the method used by S1 in Embodiment 1, that the control packet b1' corresponds to a data packet in the third data queue. When C2 is 1, S3 sends the data packet B1 by using the port connected to the link 5. After the data packet B1 is sent, the data packet B2 becomes a data packet at the head of the third data queue. The data packet B1 is sent to R2 through the link 5.

S612. The intermediate node places the C2 received data packets in the data queue of the intermediate node.

For a specific method in which the intermediate node buffers the third data packet in S612, refer to corresponding content in S207 in Embodiment 1 or corresponding content in S411 in Embodiment 2.

In Embodiment 3, with reference to the methods in S208 to S212 in Embodiment 1, the third host, the intermediate node, and the fourth host each may send a data packet of the second traffic flow and a control packet corresponding to the second traffic flow, and details are not described herein again.

In the method provided in Embodiment 3 of this application, the intermediate node is provided with the two control queues to store control packets with different priorities, and the token bucket of the intermediate node schedules packets in the two control queues according to the priority policy. This helps preferentially process and send a data packet corresponding to a control packet with a high priority in the network, and helps meet a bearer requirement of the traffic flow having a special requirement. For example, in the data center scenario, a mice flow needs to have a minimum flow completion time.

Embodiment 4

Figure 7:
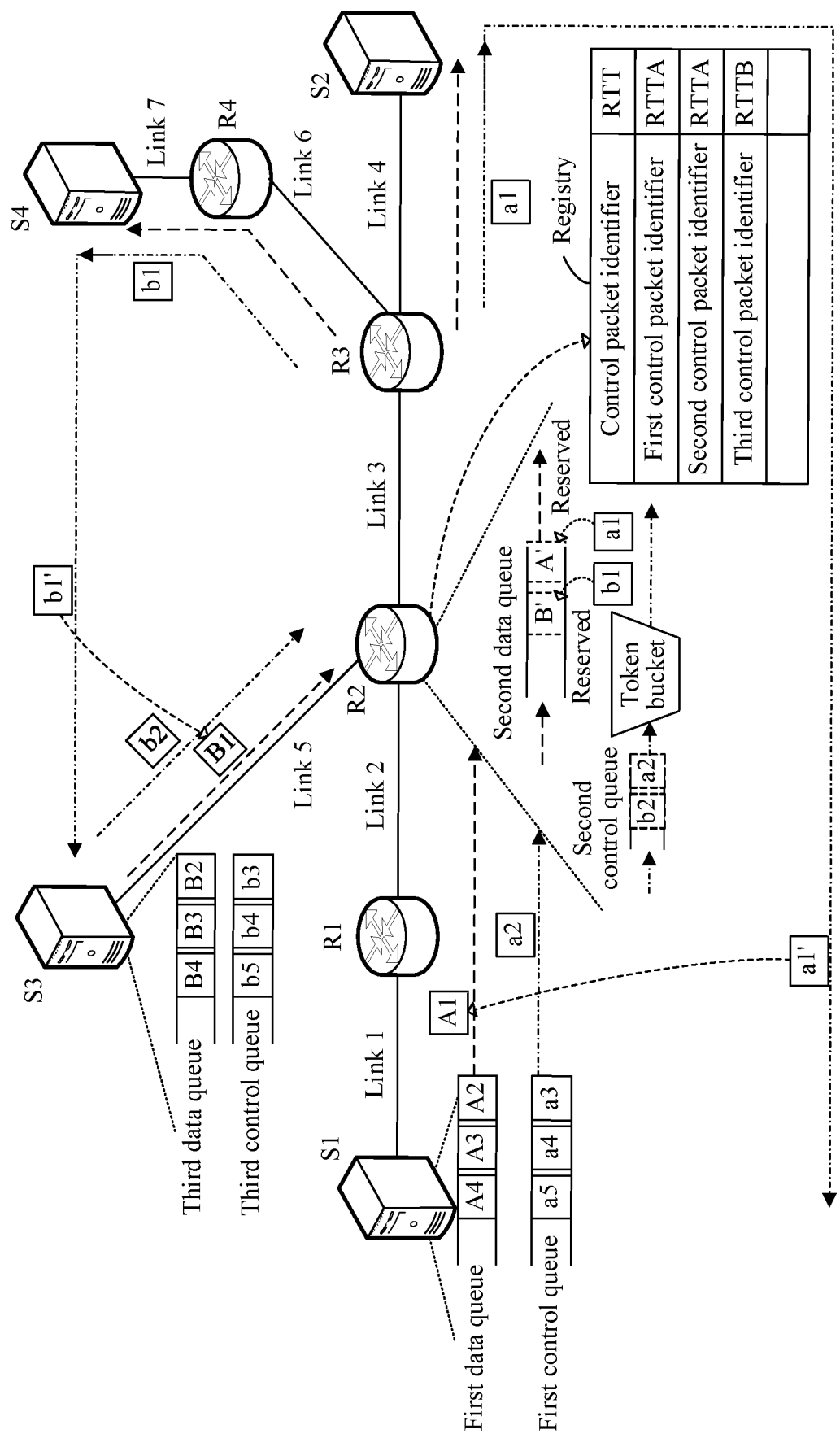
FIG. 7 is a schematic diagram of a scenario according to Embodiment 4 of this application.

FIG. 7 is a schematic diagram of a scenario according to Embodiment 4 of this application. In the scenario provided in Embodiment 4 of this application, R2 in Embodiment 2 is optimized based on the scenario provided in Embodiment 2. Specifically, a second data queue in Embodiment 4 may be a storage space reserved for a data packet of which sending is triggered by a sent control packet. For devices and links in Embodiment 4 that are the same as those in Embodiment 2, refer to corresponding descriptions in Embodiment 2.

Figure 8:
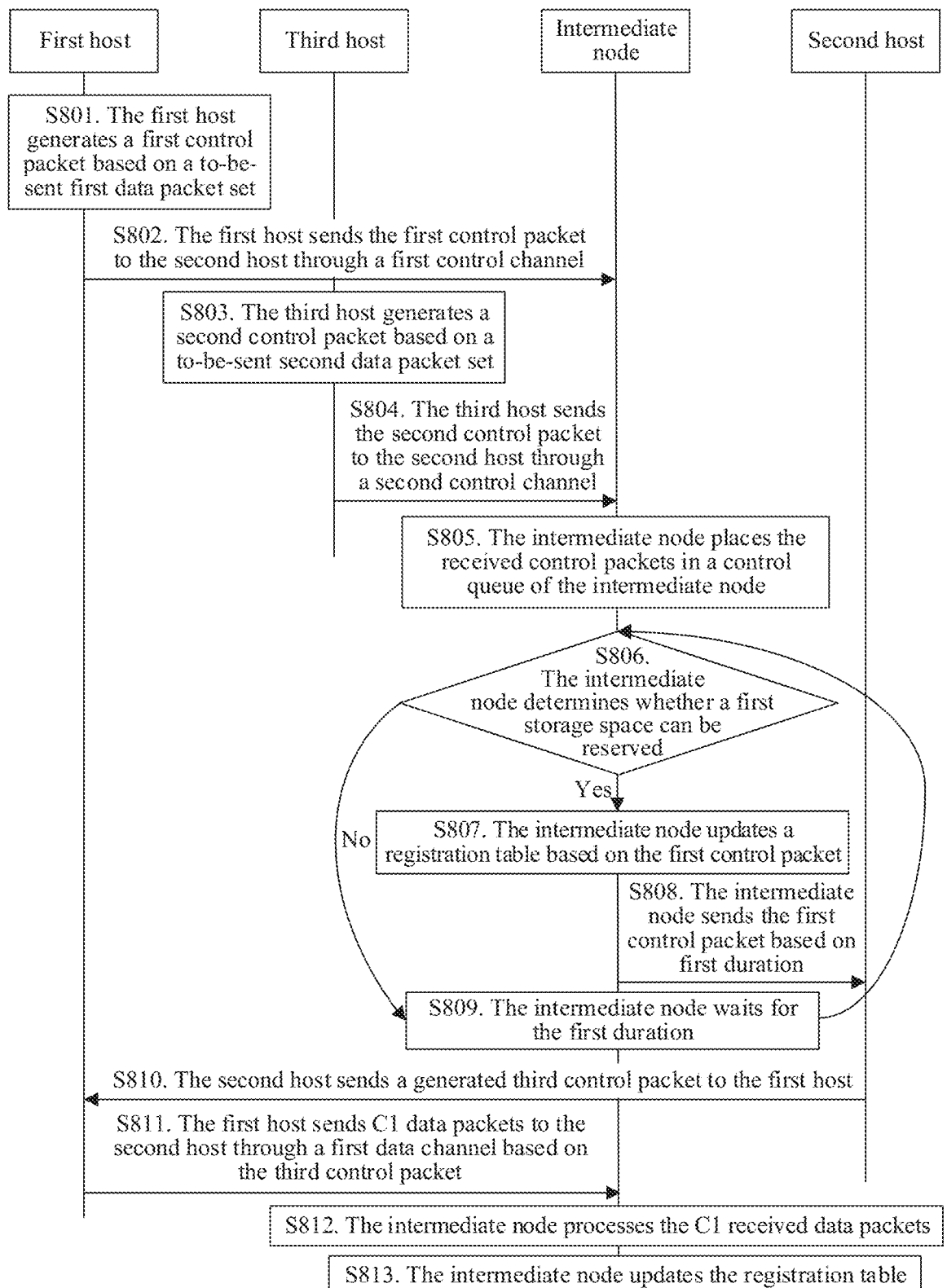
FIG. 8 is a schematic flowchart of a method for controlling traffic in a packet-based network according to Embodiment 4 of this application.

FIG. 8 is a schematic flowchart of a method for controlling traffic in a packet-based network according to Embodiment 4 of this application. The method provided in Embodiment 4 may be applied to the scenario shown in FIG. 7. An intermediate node in Embodiment 4 may dynamically adjust a sending period of a buffered control packet by using the method in Embodiment 2. The intermediate node in Embodiment 4 may further reserve a storage space for a data packet of which sending is triggered by a sent control packet. With reference to FIG. 7 and FIG. 8, the following describes the method for controlling traffic in a packet-based network according to Embodiment 4 of this application.

S801. A first host generates a first control packet based on a to-be-sent first data packet set.

For a method in which the first host generates the first control packet in S801, refer to corresponding content in S401. The first host in Embodiment 4 adds an obtained first RTT to the generated first control packet, for example, to a header of the first control packet. The first RTT may be a specified empirical value. Alternatively, the first RTT may be duration obtained by multiplying an average by a coefficient greater than 1, and the average is an average of RTT duration that is detected by the first host and that is of at least one control packet sent by the first host. In this embodiment of this application, an RTT of a control packet is duration between a moment at which a transmit end sends the control packet and a moment at which the transmit end receives a control packet fed back by a receive end. The header of the first control packet in Embodiment 4 further includes a sequence number. In a scenario in which one control packet triggers sending of C1 data packets, a header of the control packet needs to carry C1 sequence numbers, to identify the C1 data packets of which sending is triggered by the control packet. The sequence number in Embodiment 4 is also used to distinguish between control packets generated by the first host at different time points. The first data packet set includes a first data packet and a second data packet. In the scenario shown in FIG. 7, S1 is S1 in the scenario shown in FIG. 1, S1 includes a first data queue and a first control queue, a control packet a1 is the first control packet, and a data packet A1 is the first data packet. In an initial phase of S1, the control packet a1 is at the head of the first control queue, and the data packet A1 is at the head of the first data queue. The initial phase of S1 is a phase in which S1 does not send any data packet or any control packet.

S802. The first host sends the first control packet to a second host through a first control channel.

For a method in which the first host sends the first control packet in S802, refer to corresponding content in S402. In Embodiment 4, the first host is a transmit end on a first physical link, and the second host is a receive end on the first physical link. The first physical link is a physical link between the first host and the second host. In the scenario shown in FIG. 7, S2 may be S2 in the scenario in FIG. 1.

In Embodiment 4, a sequence of performing S803 and S804 is not limited to the following sequence. In an implementation, S803 may be performed at the same time as S801, and S804 is performed after S802. In another implementation, S803 may be performed before S801, and S804 is performed after S802.

S803. A third host generates a second control packet based on a to-be-sent second data packet set.

To be distinguished from the data packets included in the first data packet set, the second data packet set includes a third data packet and a fourth data packet. The third data packet is a data packet that ranks first in the second data packet set, and the third data packet is at the head of a data queue of the third host. The fourth data packet is a data packet that ranks second in the second data packet set, and the fourth data packet is immediately adjacent to the third data packet in the data queue of the third host. For a specific method in S803, refer to corresponding content in S403. The second control packet includes a sequence number and a second RTT. The sequence number included in the second control packet may be the same as the sequence number included in the first control packet. For a method in which the third host obtains the second RTT, refer to the method in which the first host obtains the first RTT. In the scenario shown in FIG. 7, S3 includes a third control queue and a third data queue. In an initial phase of S3, a data packet B1 is a data packet at the head of the third data queue. The data packet B1 is the third data packet, and a data packet B2 is the fourth data packet. A control packet b1 is the second control packet, and the control packet b1 is a control packet at the head of the third control queue. The initial phase of S3 is a phase in which S3 does not send any data packet or any control packet.

S804. The third host sends the second control packet to a second host through a second control channel.

In Embodiment 4, the third host is a transmit end on a second physical link, and the fourth host is a receive end on the second physical link. The second physical link is a physical link between the third host and the fourth host. The second control packet sent by the third host is sent to the fourth host hop by hop by using the intermediate node on the second physical link. For a specific method in S804, refer to corresponding content in S404 in Embodiment 2. In the scenario shown in FIG. 7, S3 may send the control packet b1 by using a port connected to a link 5, and the control packet b1 is sent to R2 through the link 5. After the control packet b1 is sent, a control packet b2 is at the head of the third control queue.

S805. The intermediate node places the received control packets in a control queue of the intermediate node.

For a specific method in S805, refer to corresponding content in S405. In Embodiment 4, the intermediate node is the first node at which the first physical link and the second physical link overlap, for example, R2 in FIG. 7. In the scenario shown in FIG. 7, R3 may use a same structure as R2, R1 may use the structure of R2 in FIG. 1 or FIG. 7, and R4 may also use the structure of R2 in FIG. 1 or FIG. 7. In the scenario shown in FIG. 7, R2 includes the second data queue and a second control queue. When the control packet a1 arrives at R2 before the control packet b1, the control packet a1 is placed at the head of the second control queue, the control packet b1 is placed at a location adjacent to that of the control packet a1 in the second control queue, and control packets subsequently received by R2 through the link 5 and a link 2 are placed in the second control queue in a receiving sequence.

S806. The intermediate node determines whether a first storage space can be reserved; and if the intermediate node determines that the first storage space can be reserved, performs S807; or if the intermediate node determines that the first storage space cannot be reserved, performs S809.

For example, the intermediate node determines whether a data queue of the intermediate node includes a free and unreserved storage space and whether a registration table of the intermediate node includes an unoccupied entry. A quantity of entries in the registration table may be set according to a requirement. This is not specifically limited in this embodiment of this application. When the data queue of the intermediate node includes the free and unreserved storage space and the registration table of the intermediate node includes at least C1 unoccupied entries, the intermediate node determines to reserve the first storage space, and then performs S807. The first storage space is used to buffer C1 data packets of which sending is triggered by the first control packet. The first storage space needs to be greater than or equal to a storage space occupied by the C1 data packets. The free and unreserved storage space included in the data queue of the intermediate node is greater than or equal to the first storage space. When the data queue of the intermediate node does not include the free and unreserved storage space, or the free and unreserved storage space included in the data queue of the intermediate node is smaller than the first storage space, or the registration table of the intermediate node does not include the C1 unoccupied entries, the intermediate node determines not to reserve the first storage space, and then performs S809. There are two cases in which the data queue of the intermediate node does not include the free and unreserved storage space: One case is that the data queue of the intermediate node is fully occupied by buffered data packets. The other case is that the data queue of the intermediate node is not fully occupied by buffered data packets, but a remaining free and unreserved storage space is smaller than the first storage space. Any node in the packet-based network may perform traffic control by using the processing method used by the intermediate node. In the scenario shown in FIGS. 7, R1, R2, R3, and R4 each may perform determining by using the method used by the intermediate node. A storage space A' on R2 is the first storage space.

S807. The intermediate node updates the registration table based on the first control packet, and then performs S808.

For example, when one control packet triggers sending of C1 data packets, and C1 is 1, that the intermediate node updates the registration table based on the first control packet includes: The intermediate node generates a first identifier based on the sequence number and a first parameter set that are included in the first control packet, where the sequence number included in the first control packet is used to identify the first control packet, and the first parameter set is a parameter set shared by the first control packet and the C1 data packets of which sending is triggered by the first control packet; the intermediate node obtains the first RTT included in the first control packet; and the intermediate node records the first identifier and the first RTT included in the first control packet in an idle entry of the registration table. In an implementation, when one control packet triggers sending of C1 data packets, and C1 is greater than 1, the first control packet includes C1 sequence numbers. Correspondingly, the intermediate node may generate C1 identifiers based on the C1 sequence numbers and a first parameter set included in the first control packet. The C1 identifiers may be represented as an $i^{th}$ identifier, and i is an integer greater than or equal to 1 and less than or equal to C1. The intermediate node writes the C1 identifiers and an RTT included in the first control packet into C1 entries in the registration table.

In the scenario shown in FIG. 7, R2 may reserve the storage space A' for the data packet A1 in the second data queue based on the sent control packet a1. The storage space A' is the first storage space. In an IP network, a parameter set shared by the control packet a1 and the data packet A1 is a 5-tuple. R2 may generate a first control packet identifier based on the 5-tuple and a sequence number that are included in the control packet a1. The first control packet identifier is the first identifier. R2 obtains the first RTT included in the control packet a1, namely, an RTTA. R2 writes the first control packet identifier and the RTTA into an unoccupied entry in the registration table shown in FIG. 7. When C1 is greater than 1, C1 sequence numbers included in the control packet a1 may be used to distinguish between C1 data packets of which sending is triggered by the control packet a1. For example, when C1 is 2, the C1 sequence numbers include a first sequence number and a second sequence number. R2 may generate the first control packet identifier based on the 5-tuple and the first sequence number that are included in the control packet a1, and R2 may generate a second control packet identifier based on the 5-tuple and the second sequence number that are included in the control packet a1. R2 obtains an RTT included in the control packet a1, namely, an RTTA, and R2 writes the first control packet identifier, the second control packet identifier, and the RTTA into two unoccupied entries in the registration table shown in FIG. 7.

S808. The intermediate node sends the first control packet based on first duration, and then performs S810.

For a specific method in S808, refer to corresponding content in S406. The first duration in Embodiment 4 is the same as the first duration in Embodiment 2 or Embodiment 1. After the intermediate node sends the first control packet, the intermediate node starts a corresponding timer for each of the C1 entries in the registration table, to determine whether data packets corresponding to the C1 entries can be received within the first RTT (the RTTA in FIG. 7). The C1 entries in the registration table correspond to C1 timers, and a $k^{th}$ entry corresponds to a $k^{th}$ timer, where k is an integer greater than or equal to 1 and less than or equal to C1. Duration of the $k^{th}$ timer is set to the first RTT. After the $k^{th}$ timer expires, if the intermediate node has not received a $k^{th}$ data packet in the C1 data packets, the intermediate node releases resources reserved for the $k^{th}$ data packet. The C1 data packets are data packets of which sending is triggered by the first control packet. The resources reserved for the $k^{th}$ data packet include a storage space reserved for the $k^{th}$ data packet in the first storage space and the entry corresponding to the $k^{th}$ timer in the registration table. The intermediate node in Embodiment 4 may also adjust the first duration according to the method in Embodiment 2. An example in which the first duration is 1.344 us is used. In the scenario shown in FIG. 7, a token bucket on R2 sends, at an interval of 1.344 us, a control packet that is read from the second control queue, and an interval between a moment of sending the control packet a1 and a moment of sending the control packet b1 is 1.344 us.

S809. The intermediate node waits for the first duration, and then performs S806.

For example, after determining not to reserve the first storage space, the intermediate node waits for the first duration, and then determines whether the data queue and the registration table of the intermediate node meet a reservation condition in S806.

S810. The second host sends a generated third control packet to the first host.

For a specific method in S810, refer to S407. S810 is performed after S808. In the scenario shown in FIG. 7, a control packet a1' is the third control packet. For a method in which S2 generates and sends the control packet a1', refer to corresponding content in Embodiment 2.

S811. The first host sends C1 data packets to the second host through a first data channel based on the third control packet.

For a specific method in S811, refer to corresponding content in S409 in Embodiment 2. Data packets include different sequence numbers. In Embodiment 4, the first host may add C1 sequence numbers included in the received third control packet to the C1 data packets. In the scenario shown in FIG. 7, S1 receives the control packet a1' from S2, and S1 determines that the control packet a1' corresponds to a data packet in the first data queue. S1 may determine, by using the method used by S1 in Embodiment 1, that the control packet a1' corresponds to a data packet in the first data queue. When C1 is 1, S1 adds a sequence number of the control packet a1' to the data packet A1, and sends, by using a port connected to a link 1, the data packet A1 to which the sequence number is added. After the data packet A1 is sent, a data packet A2 becomes a data packet at the head of the first data queue. The data packet A1 is sent to R2 through a path: link 1→R1→link 2. When C1 is 2, the control packet a1' includes a sequence number 1 and a sequence number 2. S1 adds the sequence number 1 to the data packet A1, and sends, by using the port connected to the link 1, the data packet A1 to which the sequence number 1 is added. S1 adds the sequence number 2 to the data packet A2, and sends, by using the port connected to the link 1, the data packet A2 to which the sequence number 2 is added. After the data packet A1 and the data packet A2 are sent, a data packet A3 becomes a data packet at the head of the first data queue. The data packet A1 and the data packet A2 are sent to R2 through the path: link 1→R1→link 2.

S812. The intermediate node processes C4 received data packets.

For example, C4 is greater than or equal to 1 and less than or equal to C1. In other words, a packet loss may occur before the C1 data packets arrive at the intermediate node. That the intermediate node processes the C4 received data packets includes: After receiving the C4 data packets, the intermediate node generates a $j^{th}$ identifier based on a sequence number j and the first parameter set that are included in a $j^{th}$ data packet in the C4 data packets, where j is an integer that ranges from 1 to C4. The intermediate node searches the registration table by using the $j^{th}$ identifier, and determines whether the registration table includes an entry corresponding to the $j^{th}$ identifier. If the registration table includes the entry corresponding to the $j^{th}$ identifier, the intermediate node places the $j^{th}$ data packet in the data queue of the intermediate node, and then performs S813. If the registration table does not include the entry corresponding to the $j^{th}$ identifier, it indicates that duration in which the intermediate node receives the $j^{th}$ data packet exceeds the first RTT, and resources reserved by the intermediate node for the $j^{th}$ data packet are released. The resources reserved for the $j^{th}$ data packet include a storage space reserved for the $j^{th}$ data packet in the first storage space and an entry corresponding to the $j^{th}$ data packet in the registration table. The entry corresponding to the $j^{th}$ data packet includes the $j^{th}$ identifier and the first RTT. The $j^{th}$ identifier is an identifier generated based on the $j^{th}$ sequence number and the first parameter set that are included in the first control packet. The intermediate node may determine whether the data queue of the intermediate node includes a free and unreserved storage space that can accommodate the $j^{th}$ data packet. If the data queue of the intermediate node includes the free and unreserved storage space that can accommodate the $j^{th}$ data packet, the intermediate node places the $j^{th}$ data packet in the data queue. If the data queue of the intermediate node does not include the free and unreserved storage space that can accommodate the $j^{th}$ data packet, the intermediate node discards the $j^{th}$ data packet. In this way, it can be ensured that C4 data packets that arrive at the intermediate node and that are in the C1 data packets of which sending is triggered by the first control packet are prevented from being discarded due to a lack of a storage space. The first parameter set included in the $j^{th}$ data packet in the C4 data packets is a parameter set shared with the first control packet. The sequence number included in the $j^{th}$ data packet in the C4 data packets is one of the C1 sequence numbers included in the first control packet, where j is an integer greater than or equal to 1 and less than or equal to C4.

In the scenario shown in FIG. 7, when C4 is 1, in the IP network, R2 obtains a first data packet identifier based on the 5-tuple and the sequence number that are included in the data packet A1. The first data packet identifier may be the $j^{th}$ identifier. R2 searches the registration table shown in FIG. 7 based on the first data packet identifier. If R2 finds an entry corresponding to the first data packet identifier, R2 places the data packet A1 in the storage space A' of the second data queue; or if R2 does not find an entry corresponding to the first data packet identifier, R2 determines that duration from a moment of sending the control packet a1 to a moment of receiving the data packet A1 exceeds the RTTA. After determining that the free and unreserved storage space in the second data queue can accommodate the data packet A1, R2 may further place the data packet A1 in the second data queue; or if it is determined that the free and unreserved storage space in the second data queue cannot accommodate the data packet A1, R2 discards the data packet A1.

S813. The intermediate node updates the registration table.

For example, after finding the entry corresponding to the $j^{th}$ identifier in the registration table, the intermediate node releases the entry corresponding to the $j^{th}$ identifier. In this way, an entry in the registration table can be released in time for subsequently using for a control packet and a data packet.

In an implementation, after S808, and after the timer in S808 expires, the intermediate node releases the entry corresponding to the $j^{th}$ identifier in the registration table and the storage space reserved for the $j^{th}$ identifier.

In an implementation, after determining to reserve the first storage space, the intermediate node may continue to determine whether a second storage space can be reserved. The second storage space is used to store a data packet of which sending is triggered by the second control packet. For a method for reserving the second storage space and storing the third data packet in the second storage space in Embodiment 4, refer to content in S806 to S813.

In the scenario shown in FIG. 7, the registration table further includes a third control packet identifier and an RTTB, and the RTTB is the second RTT. The RTTB may be the second RTT carried in the control packet b1 received by R2. The third control packet identifier is obtained through calculation based on a sequence number included in the control packet b1 and a second parameter set included in the control packet b2. Before sending the control packet b1, the intermediate node may determine, by using the method for reserving the first storage space, whether to reserve a storage space for a data packet of which sending is triggered by the control packet b1, and perform a corresponding operation on the registration table.

In the method provided in Embodiment 4, after sending one control packet, for example, the first control packet, the intermediate node can reserve, in advance based on the registration table of the intermediate node and a storage space of the data queue of the intermediate node, a storage space for a data packet of which sending is triggered by the sent control packet. Therefore, when the data packet of which sending is triggered by the sent control packet arrives at the data queue of the intermediate node, the data packet is not discarded because there is the storage space. This helps reduce a packet loss in a data packet transmission process.

In the methods provided in Embodiment 2 to Embodiment 4 of this application, in a phase in which sending of a traffic flow is to be ended, the source host may still alternately send control packets and data packets. However, for the intermediate node, there may be a case in which a control packet is sent, but a buffered data packet is not sent, and a data packet to be sent subsequently enters a data queue. In this case, the intermediate node sends all remaining data packets in the data queue to corresponding destination hosts. When the control queue of the intermediate node is fully occupied by buffered control packets, the intermediate node has no buffer space to buffer a received control packet. Therefore, the intermediate node discards the received control packet, until the intermediate node has a buffer space to buffer a received control packet.

When Embodiment 2 of this application is combined with Embodiment 4 of this application, a sum of packet lengths of data packets that have been buffered in the data queue of the intermediate node in Embodiment 2 may include the first storage space reserved by the intermediate node. For example, the sum of the packet lengths of the buffered data packets includes a sum of packet lengths of data packets placed in the data queue and the reserved first storage space. In Embodiment 2, when the data queue of the intermediate node is in an idle state, it indicates that the data queue of the intermediate node does not include a buffered data packet, and the data queue of the intermediate node does not include the reserved first storage space.

Embodiment 5

Figure 9:
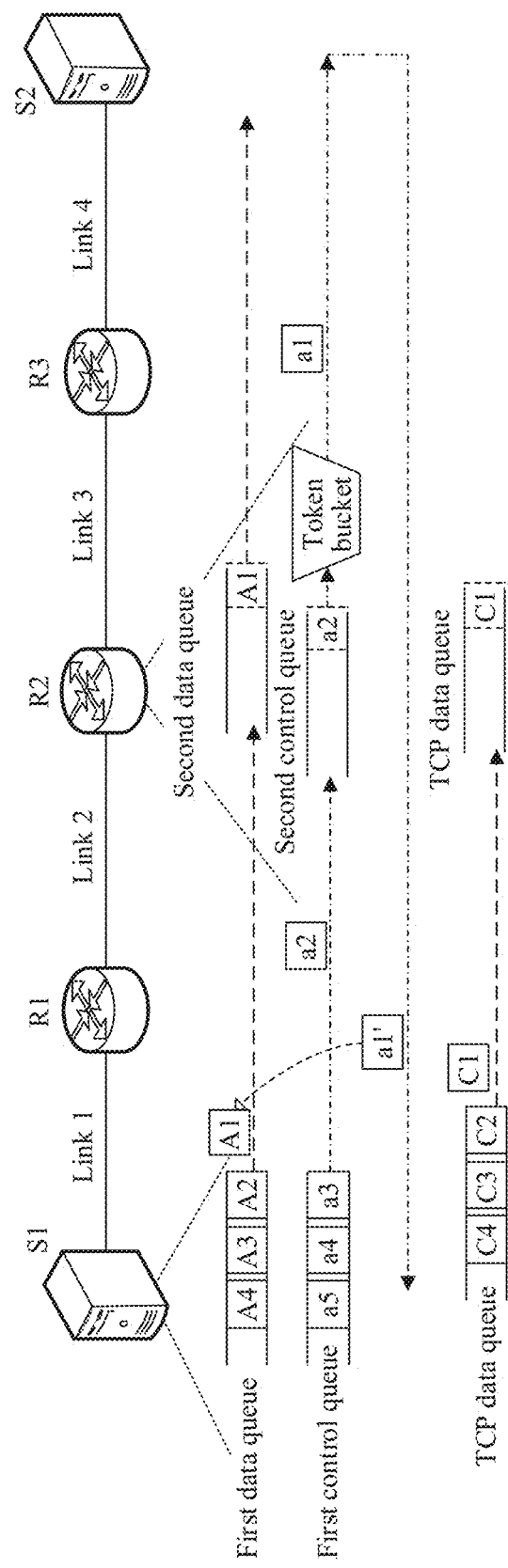
FIG. 9 is a schematic diagram of a scenario according to Embodiment 5 of this application.

FIG. 9 is a schematic diagram of a scenario according to Embodiment 5 of this application. In the scenario provided in Embodiment 5 of this application, a TCP data flow is processed based on the scenario provided in Embodiment 1. When the link 1, the link 2, the link 3, and the link 4 have redundant bandwidths in addition to bandwidths for transmitting a data packet and a control packet, the foregoing links may be further used to transmit another packet, for example, a data packet included in the TCP data flow. Specifically, a TCP data queue on S1 is used to buffer a TCP data packet included in the TCP data flow, and the TCP data packet may be identified by C, for example, a data packet C1, a data packet C2, a data packet C3, and a data packet C4 shown in FIG. 9. A priority of the TCP data queue on S1 is lower than a priority of the first data queue and is lower than a priority of the first control queue. In other words, S1 schedules and sends a TCP data packet in the TCP data queue on S1 only when neither the first data queue nor the first control queue on S1 has a to-be-scheduled packet or a to-be-sent packet. A TCP data queue used to buffer the TCP data packet is provided on R2. R2 includes three queues: a second data queue, a second control queue, and the TCP data queue shown in FIG. 9. A priority of the TCP data queue on R2 is lower than a priority of the second data queue and is lower than a priority of the second control queue. In other words, R2 schedules and sends a TCP data packet in the TCP data queue of R2 only when neither the second data queue nor the second control queue on R2 has a to-be-scheduled packet or a to-be-sent packet. For a method in which R2 processes the second data queue and the second control queue, refer to Embodiment 1. For a method in which S1 processes the first data queue and the first control queue, refer to Embodiment 1.

Embodiment 6

Figure 10:
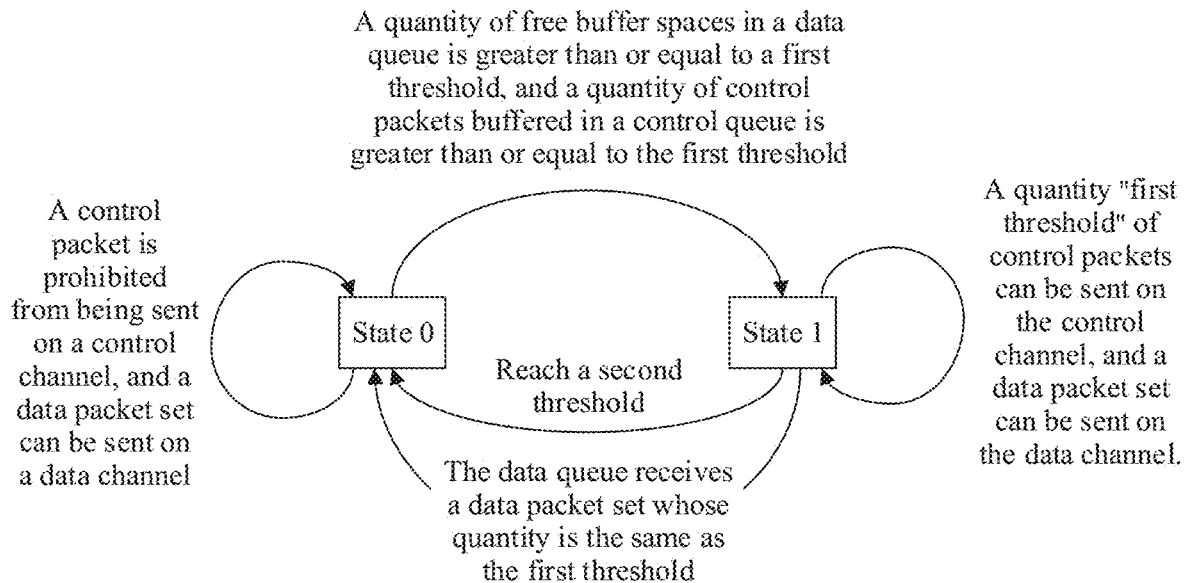
FIG. 10 is a schematic diagram of state switching of a state machine according to Embodiment 6 of this application.

FIG. 10 is a schematic diagram of state switching of a state machine according to Embodiment 6 of this application. The state machine shown in FIG. 10 may be disposed on the intermediate node in any one of Embodiment 1 to Embodiment 5. Specifically, the state machine may be disposed on the egress port of the intermediate node. The state machine may switch between a state 0 and a state 1. When the state machine is in a state 0, a control packet included in a control queue on the egress port is prohibited from being sent, and a data packet included in a data queue on the egress port can be sent. When the state machine is in a state 1, a control packet included in the control queue on the egress port can be sent, and a data packet included in the data queue on the egress port can be sent. In any one of Embodiment 1 to Embodiment 5, the control packet may be used to trigger the source host and the intermediate node to send one or more data packets. The one or more data packets may be the C data packets in Embodiment 1, or the one or more data packets may be the C1 data packets or the C2 data packets in any one of Embodiment 2 to Embodiment 4.

As shown in FIG. 10, a free buffer space in the data queue is used to buffer a data packet set that is received by the intermediate node and of which sending is triggered by a control packet. The data packet set is the C data packets in Embodiment 1, or the data packet set is the C1 data packets or the C2 data packets in any one of Embodiment 2 to Embodiment 4. Any free buffer space in the data queue is the same as a storage space occupied by the data packet set. A quantity of free buffer spaces in the data queue may be used to indicate a quantity of data packet sets that can be buffered in the data queue. When the quantity of free buffer spaces in the data queue is the first threshold, the quantity "first threshold" of free buffer spaces in the data queue can be used to buffer the quantity "first threshold" of data packet sets. When the quantity of free buffer spaces in the data queue on the egress port is greater than or equal to the first threshold, and a quantity of control packets buffered in the control queue on the egress port is greater than or equal to the first threshold, the state machine switches from a state 0 to a state 1. The first threshold is an integer greater than or equal to 1. Alternatively, the first threshold in Embodiment 6 may be a maximum value of a quantity of data packet sets that can be buffered in a buffer space of the intermediate node. The state machine in a state 1 sends a quantity "first threshold" of control packets buffered in the control queue, and the sent control packets may be used to trigger to send the data packet set. The data packet set is sent and arrives at the data queue. When the data queue receives the quantity "first threshold" of data packet sets, the state machine switches from a state 1 to a state 0. When the state machine is in a state 0, a control packet in the control queue is prohibited from being sent, but a data packet set in the data queue can still be sent. In this way, a data packet accumulated in the data queue can be effectively cleared, and this can reduce a possibility of discarding a data packet. Alternatively, when the state machine does not receive, before the second threshold is reached, a data packet sent by the source host, the state machine switches from a state 1 to a state 0. The second threshold is set to L times a maximum RTT in any one of the foregoing embodiments, or is set to L times a maximum RTT in a packet-based network, where L is greater than 1 and less than or equal to 2.

In Embodiment 6 of this application, the state machine is disposed on the egress port of the intermediate node, so that a process of sending a data packet on the egress port can be controlled. This helps reduce a packet loss caused by RTT network noise or link congestion.

Embodiment 7

Figure 11:
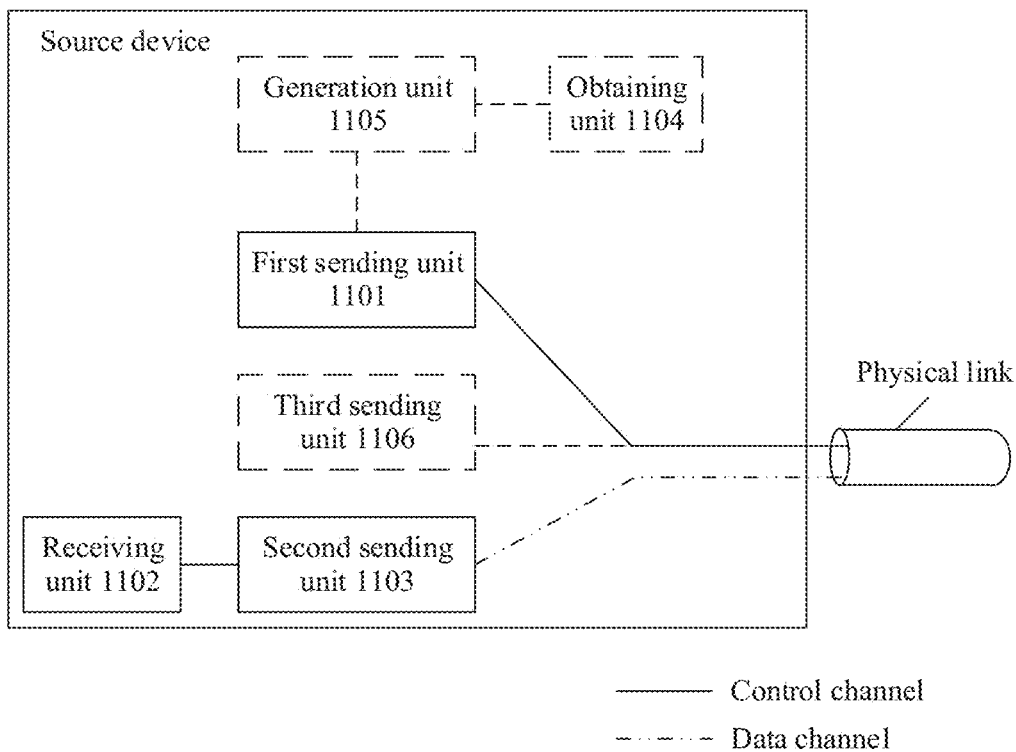
FIG. 11 is a schematic structural diagram of a source device according to Embodiment 7 of this application.

FIG. 11 is a schematic structural diagram of a source device according to Embodiment 7 of this application. The source device provided in Embodiment 7 may serve as a transmit end configured to send a specific traffic flow in a packet-based network. The source device provided in Embodiment 7 may implement a function of the source host in Embodiment 1 or a function of the device identified by S1 in Embodiment 5. Alternatively, the source device provided in Embodiment 7 may implement functions of the first host or functions of the third host in any one of Embodiment 2 to Embodiment 4. The source device provided in Embodiment 7 includes a first sending unit 1101, a receiving unit 1102, and a second sending unit 1103. The first sending unit 1101 is configured to send a first control packet to a destination device through a control channel, where the first control packet includes a parameter set. The receiving unit 1102 is configured to receive a second control packet sent by the destination device, where the second control packet includes the parameter set. The second sending unit 1103 is configured to: after the receiving unit 1102 receives the second control packet including the parameter set, send a first data packet set to the destination device through a data channel, where the first data packet set includes C data packets, C is an integer greater than or equal to 1, and any data packet in the first data packet set includes the parameter set. A ratio of a sum of packet lengths of the C data packets to a packet length of the first control packet is a ratio of a bandwidth of the data channel to a bandwidth of the control channel.

In an implementation, the receiving unit 1102 is further configured to receive a fourth control packet sent by the destination device, where the fourth control packet includes the parameter set. The second sending unit 1103 is further configured to: after the receiving unit 1102 receives the fourth control packet, send a second data packet set to the destination device through the data channel, where the second data packet set is a data packet set that is after the first data packet set in a traffic flow to which the first data packet set belongs, the second data packet set includes C data packets, and any data packet in the second data packet set includes the parameter set.

In an implementation, the source device further includes an obtaining unit 1104 and a generation unit 1105. The obtaining unit 1104 is configured to obtain a packet header of the first control packet based on any data packet in the first data packet set, where the packet header of the first control packet includes the parameter set. The generation unit 1105 is configured to generate the first control packet based on the packet header and a preset packet length of the first control packet.

In an implementation, the source device further includes a third sending unit 1106. The third sending unit 1106 is configured to send a third control packet according to an AIMD algorithm through the control channel, where the third control packet includes the parameter set.

The units included in the source device provided in Embodiment 7 may perform corresponding functions of the source host, the first host, or the third host in the foregoing embodiments. When the source device has the functions of the source host in Embodiment 1, the first sending unit 1101 is configured to support the source device in performing S202 in Embodiment 1, the receiving unit 1102 is configured to support the source device in performing S205 and S212 in Embodiment 1, the second sending unit 1103 is configured to support the source device in performing S206 in Embodiment 1, the obtaining unit 1104 and the generation unit 1105 are configured to support the source device in performing S201 in Embodiment 1, and the third sending unit 1106 is configured to support the source device in performing S208 in Embodiment 1.

When the source device has the functions of the first host in Embodiment 2 to Embodiment 4, the first sending unit 1101 is configured to support the source device in performing S402 in Embodiment 2, and/or S602 in Embodiment 3, and/or S802 in Embodiment 4, the receiving unit 1102 is configured to support the source device in performing S407 in Embodiment 2, and/or S607 in Embodiment 3, and/or S810 in Embodiment 4, the second sending unit 1103 is configured to support the source device in performing S409 in Embodiment 2, and/or S608 in Embodiment 3, and/or S811 in Embodiment 4, the obtaining unit 1104 and the generation unit 1105 are configured to support the source device in performing S401 in Embodiment 2, and/or S601 in Embodiment 3, and/or S801 in Embodiment 4, and the third sending unit 1106 is configured to support the source device in performing S412 in Embodiment 2.

When the source device has the functions of the third host in Embodiment 2 to Embodiment 4, the first sending unit 1101 is configured to support the source device in performing S404 in Embodiment 2, and/or S604 in Embodiment 3, and/or S804 in Embodiment 4, the receiving unit 1102 is configured to support the source device in performing S408 in Embodiment 2 and/or S610 in Embodiment 3, the second sending unit 1103 is configured to support the source device in performing S410 in Embodiment 2 and/or S611 in Embodiment 3, the obtaining unit 1104 and the generation unit 1105 are configured to support the source device in performing S403 in Embodiment 2, and/or S603 in Embodiment 3, and/or S803 in Embodiment 4, and the third sending unit 1106 is configured to support the source device in performing S413 in Embodiment 2.

When an integrated structure is used, functions of the obtaining unit 1104 and the generation unit 1105 included in the source device provided in Embodiment 7 may be implemented by a processing unit, and functions of the first sending unit 1101, the second sending unit 1103, the receiving unit 1102, and the third sending unit 1106 included in the source device provided in Embodiment 7 may be implemented by a communications unit. When the integrated structure is used, the source device further includes a storage unit configured to store program code and data. The storage unit may be further configured to buffer a data packet of a specific traffic flow and a control packet that matches the data packet. For corresponding content of the processing unit, the communications unit, and the storage unit, refer to corresponding content in Embodiment 1 to Embodiment 5 and Embodiment 7.

Embodiment 8

Figure 12:
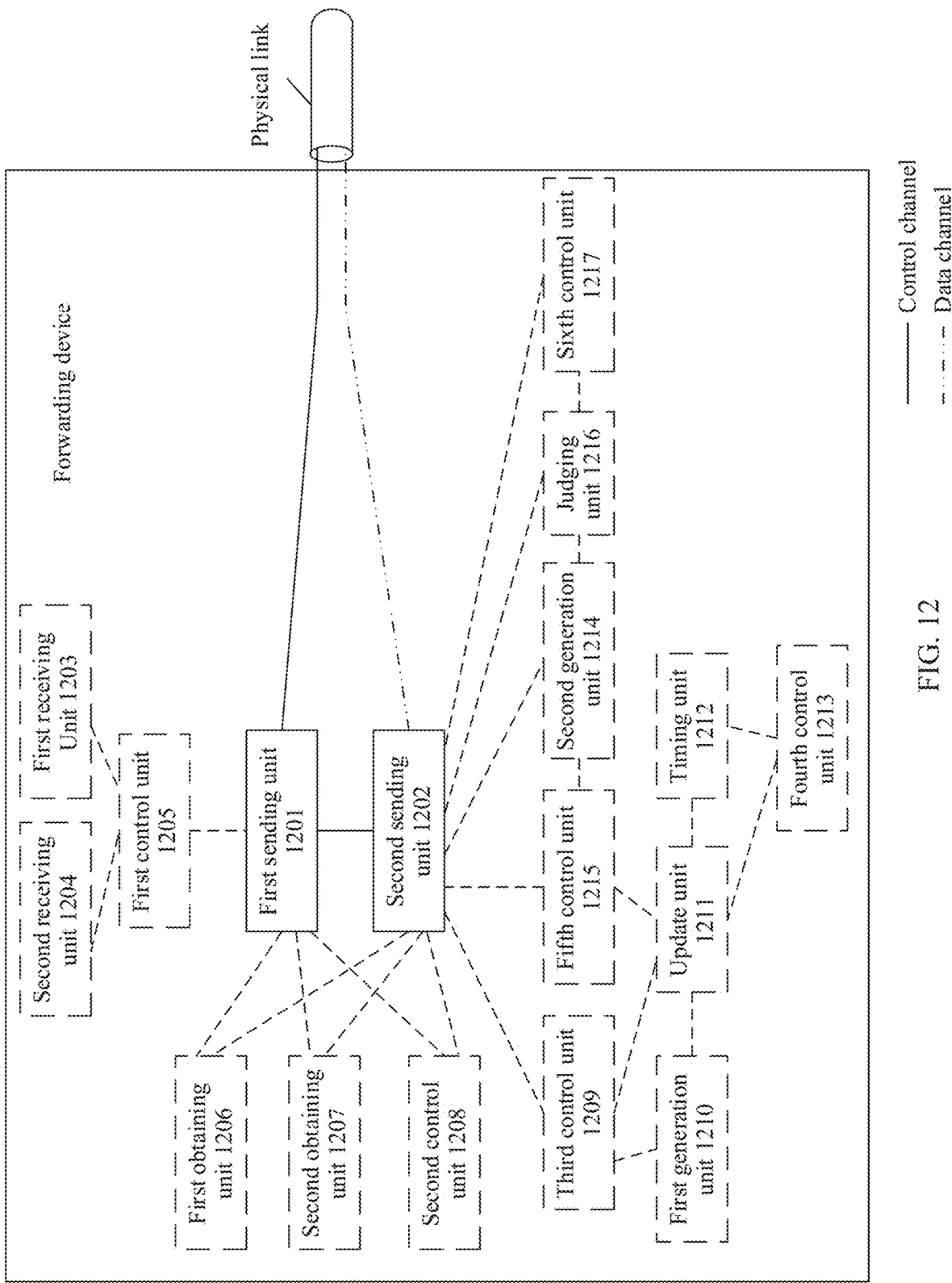
FIG. 12 is a schematic structural diagram of a forwarding device according to Embodiment 8 of this application.

FIG. 12 is a schematic structural diagram of a forwarding device according to Embodiment 8 of this application. The forwarding device provided in Embodiment 8 may serve as an intermediate node on a physical link between a transmit end and a receive end in a packet-based network. The forwarding device provided in Embodiment 8 may implement corresponding functions of the intermediate node provided in Embodiment 1, Embodiment 2, or Embodiment 4. The forwarding device provided in Embodiment 8 may further use the state machine provided in Embodiment 6. For specific content, refer to corresponding content in Embodiment 6. The forwarding device provided in Embodiment 8 includes a first sending unit 1201 and a second sending unit 1202. The first sending unit 1201 is configured to send a control packet at the head of a first control queue based on first duration, where the first duration is obtained based on a CBS and a first CIR. The second sending unit 1202 is configured to send a first data packet set at the head of a data queue based on the sent control packet, where the first data packet set includes C data packets, and C is an integer greater than or equal to 1.

In an implementation, the forwarding device further includes a first obtaining unit 1206. The first obtaining unit 1206 is configured to: when a sum of packet lengths of data packets that have been buffered in the data queue is greater than or equal to a first threshold and less than a second threshold, obtain second duration based on the CBS and a second CIR, where the second CIR is less than the first CIR, the first threshold is greater than a sum of packet lengths of the C data packets, and the second threshold is a maximum value of a sum of packet lengths of data packets that can be buffered in the data queue. The first sending unit 1201 is further configured to send a control packet at the head of the first control queue based on the second duration. The second sending unit 1202 is further configured to send a second data packet set at the head of the data queue based on the sent control packet, where the second data packet set includes C data packets.

In an implementation, the forwarding device further includes a second obtaining unit 1207. The second obtaining unit 1207 is configured to: when duration in which the data queue is in an idle state reaches a third threshold, obtain third duration based on the CBS and a third CIR, where the third CIR is greater than the first CIR, the third threshold is a larger value of a first RTT and a second RTT, the first RTT is duration from a moment at which the forwarding device sends a first control packet to a moment at which the forwarding device receives C data packets of which sending is triggered by the first control packet, and the second RTT is duration from a moment at which the forwarding device sends a second control packet to a moment at which the forwarding device receives C data packets of which sending is triggered by the second control packet. The first sending unit 1201 is further configured to send a control packet at the head of the first control queue based on the third duration. The second sending unit 1202 is further configured to send a second data packet set at the head of the data queue based on the sent control packet, where the second data packet set includes C data packets.

In an implementation, the forwarding device further includes a first receiving unit 1203, a second receiving unit 1204, and a first control unit 1205. The first receiving unit 1203 is configured to receive the first control packet from a first source device, where the first control packet includes a first parameter set. The second receiving unit 1204 is configured to receive the second control packet sent by a second source device in the packet-based network, where the second control packet includes a second parameter set, the second parameter set is different from the first parameter set, and the forwarding device is configured to send a packet of the second source device to a second destination device in the packet-based network. The first control unit 1205 is configured to place the first control packet and the second control packet in the first control queue in a sequence of receiving the first control packet and the second control packet.

In an implementation, the forwarding device further includes a second control unit 1208. The second control unit 1208 is configured to: when a sum of packet lengths of data packets that have been buffered in the data queue is greater than or equal to a second threshold, control the second sending unit 1202 to send a second data packet set at the head of the data queue, and control the first sending unit 1201 to stop sending a control packet at the head of the first control queue, where the second data packet set includes C data packets, and the second threshold is a maximum value of a sum of packet lengths of data packets that can be buffered in the data queue.

In an implementation, the forwarding device further includes a third control unit 1209, a first generation unit 1210, and an update unit 1211. The third control unit 1209 is configured to: when the data queue includes a free and unreserved storage space and a registration table of the forwarding device includes C unoccupied entries, determine to reserve a first storage space, where the first storage space is used to buffer the C data packets of which sending is triggered by the first control packet. The first generation unit 1210 is configured to generate C identifiers based on the first parameter set and C sequence numbers, where an $i^{th}$ identifier in the C identifiers is an identifier generated based on the first parameter set and an $i^{th}$ sequence number in the C sequence numbers, and i is an integer that ranges from 1 to C. The update unit 1211 is configured to write the first RTT and the C identifiers into the C unoccupied entries, where an $i^{th}$ entry in the C entries includes the first RTT and the $i^{th}$ identifier.

In an implementation, the forwarding device further includes a timing unit 1212 and a fourth control unit 1213. The timing unit 1212 is configured to set an $i^{th}$ timer for the $i^{th}$ entry in the C entries, where duration of the $i^{th}$ timer is the first RTT. The fourth control unit 1213 is configured to: if an $i^{th}$ data packet is not received before the $i^{th}$ timer expires, control the update unit 1212 to release the $i^{th}$ entry in the C entries and a storage space that is reserved for the $i^{th}$ data packet in the first storage space, where the $i^{th}$ data packet is any one of the C data packets of which sending is triggered by the first control packet, and the $i^{th}$ data packet includes the first parameter set and the $i^{th}$ sequence number.

In an implementation, the first data packet set includes the C data packets of which sending is triggered by the first control packet, a $j^{th}$ data packet in the first data packet set includes the first parameter set and a $j^{th}$ sequence number, and j is an integer that ranges from 1 to C. The forwarding device further includes a second generation unit 1214 and a fifth control unit 1215. The second generation unit 1214 is configured to generate a $j^{th}$ identifier based on the first parameter set and the $j^{th}$ sequence number that are included in the $j^{th}$ data packet. The fifth control unit 1215 is configured to: after it is determined that the registration table includes the $j^{th}$ identifier, place the $j^{th}$ data packet in the data queue of the forwarding device, and control the update unit 1211 to release an entry including the $j^{th}$ identifier in the registration table.

In an implementation, the first data packet set includes the C data packets of which sending is triggered by the first control packet, a $j^{th}$ data packet in the first data packet set includes the first parameter set and a $j^{th}$ sequence number, and j is an integer that ranges from 1 to C. The forwarding device further includes a second generation unit 1214, a judging unit 1216, and a sixth control unit 1217. The second generation unit 1214 is configured to generate a $j^{th}$ identifier based on the first parameter set and the $j^{th}$ sequence number that are included in the $j^{th}$ data packet. The judging unit 1216 is configured to: after it is determined that the registration table does not include the $j^{th}$ identifier, determine whether the data queue includes a free and unreserved storage space that can accommodate the $j^{th}$ data packet. The sixth control unit 1217 is configured to: after the judging unit 1216 determines that the data queue includes the free and unreserved storage space that can accommodate the $j^{th}$ data packet, place the $j^{th}$ data packet in the data queue of the forwarding device. In another implementation, the sixth control unit 1217 is further configured to: after the judging unit 1216 determines that the data queue does not include the free and unreserved storage space that can accommodate the $j^{th}$ data packet, discard the $j^{th}$ data packet.

The units included in the forwarding device provided in Embodiment 8 may perform corresponding functions of the intermediate node provided in Embodiment 1, Embodiment 2, or Embodiment 4. The first sending unit 1201 is configured to support the forwarding device in performing S204 and S210 in Embodiment 1, and/or S406 in Embodiment 2, and/or S808 in Embodiment 4. The second sending unit 1202 is configured to support the forwarding device in performing S211 in Embodiment 1 and/or S416 in Embodiment 2. The first receiving unit 1203 is configured to support the forwarding device in performing S202 in Embodiment 1, and/or S402 in Embodiment 2, and/or S802 in Embodiment 4. The second receiving unit 1204 is configured to support the forwarding device in performing S404 in Embodiment 2 and/or S804 in Embodiment 4. The first control unit 1205 is configured to support the forwarding device in implementing S203 and S209 in Embodiment 1, and/or S405 and S414 in Embodiment 2, and/or S805 in Embodiment 4. The first obtaining unit 1206, the second obtaining unit 1207, and the first sending unit 1201 are configured to support the forwarding device in performing S415 in Embodiment 2. The third control unit 1209 is configured to support the forwarding device in performing S806 in Embodiment 4. The first generation unit 1210 and the update unit 1211 are configured to support the forwarding device in performing S807 in Embodiment 4. The update unit 1211, the second generation unit 1214, the fifth control unit 1215, the judging unit 1216, and the sixth control unit 1217 are configured to support the forwarding device in performing S812 and S813 in Embodiment 4.

When an integrated structure is used, functions of the first control unit 1205, the first obtaining unit 1206, the second obtaining unit 1207, the second control unit 1208, the third control unit 1209, the first generation unit 1210, the update unit 1211, the timing unit 1212, the fourth control unit 1213, the fifth control unit 1215, the second generation unit 1214, the judging unit 1216, and the sixth control 1217 unit included in the forwarding device provided in Embodiment 8 may be implemented by a processing unit, and functions of the first receiving unit 1203, the second receiving unit 1204, the first sending unit 1201, and the second sending unit 1202 included in the forwarding device provided in Embodiment 8 may be implemented by a communications unit. When the integrated structure is used, the forwarding device further includes a storage unit configured to store program code and data. The storage unit may be further configured to buffer a data packet of a specific traffic flow and a control packet that matches the data packet. For specific content of the processing unit, the communications unit, and the storage unit, refer to corresponding content in Embodiment 1 to Embodiment 6 and Embodiment 8.

Embodiment 9

Figure 13:
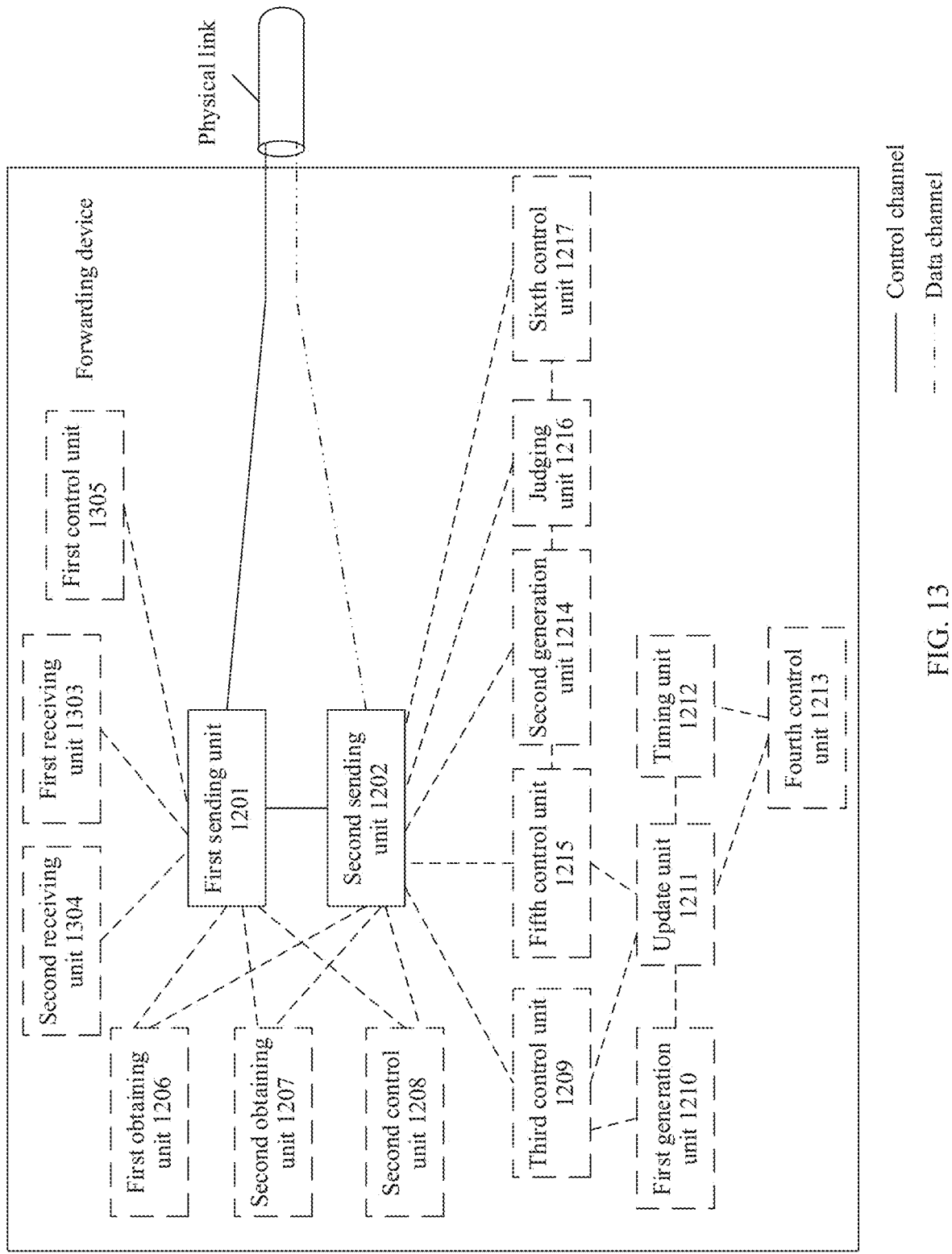
FIG. 13 is a schematic structural diagram of a forwarding device according to Embodiment 9 of this application.

FIG. 13 is a schematic structural diagram of a forwarding device according to Embodiment 9 of this application. The forwarding device provided in Embodiment 9 may serve as an intermediate node on a physical link between a transmit end and a receive end in a packet-based network. The forwarding device provided in Embodiment 9 may implement functions of the intermediate node in Embodiment 3. The forwarding device provided in Embodiment 9 may further use the state machine provided in Embodiment 6. For specific content, refer to corresponding content in Embodiment 6. The forwarding device provided in Embodiment 9 may be obtained by replacing a part of a structure of the forwarding device provided in Embodiment 8. Specifically, a first receiving unit 1303 included in the forwarding device provided in Embodiment 9 replaces the first receiving unit 1203 included in the forwarding device provided in Embodiment 8, a second receiving unit 1304 included in the forwarding device provided in Embodiment 9 replaces the second receiving unit 1204 included in the forwarding device provided in Embodiment 8, and a first control unit 1305 included in the forwarding device provided in Embodiment 9 replaces the first control unit 1205 included in the forwarding device provided in Embodiment 8. For content of other units included in the forwarding device provided in Embodiment 9 shown in FIG. 13, refer to corresponding content in Embodiment 8.

In an implementation, the first receiving unit 1303 is configured to: receive a first control packet from a first source device; and place the first control packet in a first control queue, where the first control packet includes a first parameter set. The second receiving unit 1304 is configured to: receive a second control packet from a second source device; and place the second control packet in a second control queue, where a priority of the second control queue is lower than a priority of the first control queue, the second control packet includes a second parameter set, the second parameter set is different from the first parameter set, and the forwarding device is configured to send a packet of the second source device to a second destination device in the packet-based network. The first control unit 1305 is configured to control, based on the priority of the first control queue and the priority of the second control queue, a first sending unit 1201 to send a control packet in the first control queue or a control packet in the second control queue according to a priority scheduling policy after the first duration expires, where the priority scheduling policy is PQ or WFQ. The units included in the forwarding device provided in Embodiment 9 may perform corresponding functions of the intermediate node in Embodiment 3. The first receiving unit 1303 and the second receiving unit 1304 are configured to support the forwarding device in performing S602, S604, and S605 in Embodiment 3. A first control unit 1305 is configured to support the forwarding device in performing S606 in Embodiment 3.

The forwarding device provided in Embodiment 8 or Embodiment 9 of this application further includes a module configured to place a received data packet in the data queue of the intermediate node. The module is configured to support the forwarding device provided in Embodiment 8 or Embodiment 9 in performing S207 in Embodiment 1, and/or S411 in Embodiment 2, and/or S609 and S612 in Embodiment 3. Based on the integrated structure in Embodiment 8, when the forwarding device provided in Embodiment 9 uses the integrated structure, functions of the first receiving unit 1303 and the second receiving unit 1304 may be implemented by a communications module, and functions of the first control unit 1305 may be implemented by a processing module. For same content between the integrated structure in Embodiment 9 and the integrated structure in Embodiment 8, refer to corresponding content in Embodiment 8.

Embodiment 10

Figure 14:
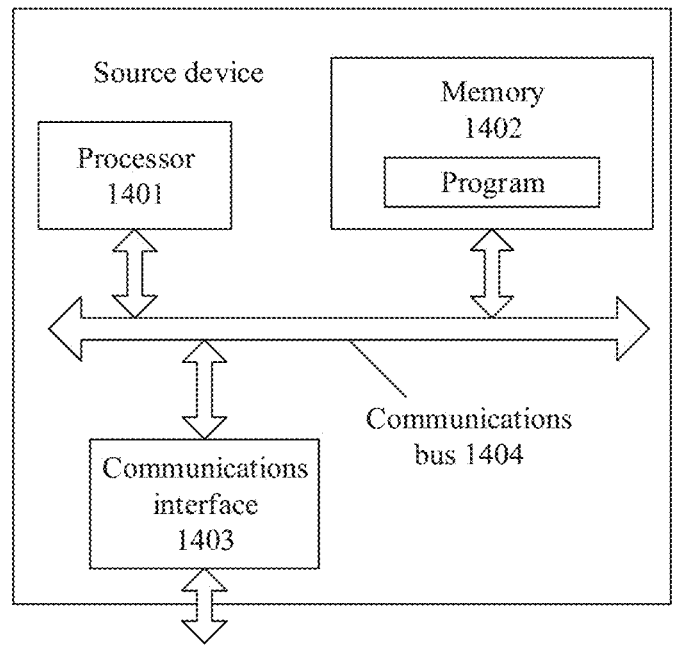
FIG. 14 is a schematic structural diagram of a source device according to Embodiment 10 of this application.

FIG. 14 is a schematic structural diagram of a source device according to Embodiment 10 of this application. The source device provided in Embodiment 10 may be the source device provided in Embodiment 7. A structure of the source device provided in Embodiment 10 is described from the perspective of a hardware structure. The source device provided in Embodiment 10 may implement functions of the source host in Embodiment 1 or functions of the device identified by S1 in Embodiment 5. Alternatively, the source device provided in Embodiment 10 may implement functions of the first host or functions of the third host in any one of Embodiment 2 to Embodiment 4. The source device provided in Embodiment 10 includes a processor 1401, a memory 1402, a communications bus 1404, and a communications interface 1403. The processor 1401, the memory 1402, and the communications interface 1403 are connected by using the communications bus 1404. The memory 1402 is configured to store a program. The processor 1401 performs, according to an executable instruction included in the program that is read from the memory 1402, the method performed by the source host in Embodiment 1, and/or the method performed by the first host in any one of Embodiment 2 to Embodiment 4, and/or the method performed by the third host in any one of Embodiment 2 to Embodiment 4. By using the communications interface 1403, the processor 1401 may receive and send a data packet of a specific traffic flow, and receive and send a control packet corresponding to the data packet.

The hardware structure included in the source device provided in Embodiment 10 may perform corresponding functions of the source host in Embodiment 1, the first host in any one of Embodiment 2 to Embodiment 4, and/or the third host in any one of Embodiment 2 to Embodiment 4. When the source device has the functions of the source host in Embodiment 1, the communications interface 1403 is configured to support the source device in performing S202, S205, S212, S206, and S208 in Embodiment 1, the processor 1401 is configured to support the source device in performing S201 in Embodiment 1, and the memory 1402 is further configured to buffer the first control packet, the second control packet, and the first data packet set in Embodiment 1 in addition to being configured to store program code and data.

When the source device has the functions of the first host in Embodiment 2 to Embodiment 4, the communications interface 1403 is configured to support the source device in performing S402, S407, S409, and S412 in Embodiment 2, and/or S602, S607, and S608 in Embodiment 3, and/or S802, S810, and S811 in Embodiment 4, the processor 1401 is configured to support the source device in performing S401 in Embodiment 2, and/or S601 in Embodiment 3, and/or S801 in Embodiment 4, and the memory 1402 is further configured to buffer the first control packet, the fifth control packet, and the C1 data packets in Embodiment 2, and/or the first control packet and the C1 data packets in Embodiment 3, and/or the first control packet and the C1 data packets in Embodiment 4 in addition to being configured to store program code and data.

When the source device has the functions of the third host in Embodiment 2 to Embodiment 4, the communications interface 1403 is configured to support the source device in performing S404, S408, S410, and S413 in Embodiment 2, and/or S604, S610, and S611 in Embodiment 3, and/or S804 in Embodiment 4, the processor 1401 is configured to support the source device in performing S403 in Embodiment 2, and/or S603 in Embodiment 3, and/or S803 in Embodiment 4, and the memory 1402 is further configured to buffer the second control packet and the C2 data packets in Embodiment 3, and/or the second control packet in Embodiment 4 in addition to being configured to store program code and data.

Embodiment 11

Figure 15:
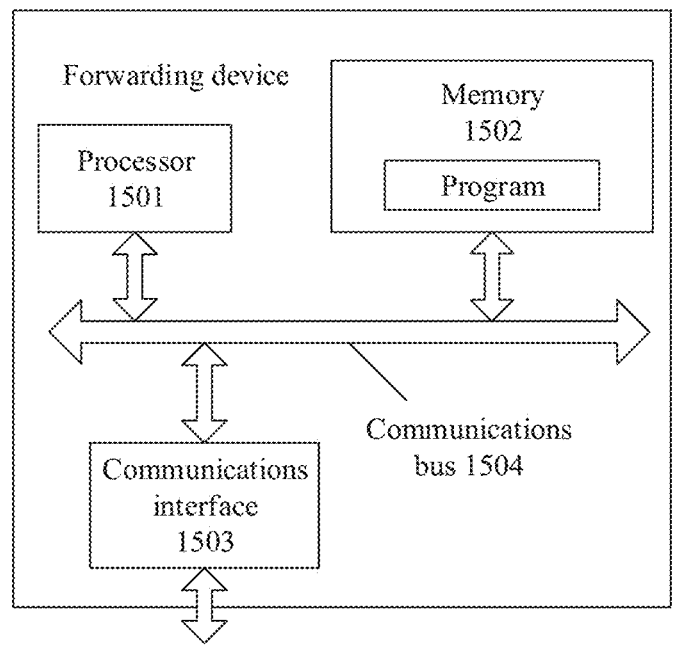
FIG. 15 is a schematic structural diagram of a forwarding device according to Embodiment 11 of this application.

FIG. 15 is a schematic structural diagram of a forwarding device according to Embodiment 11 of this application. The forwarding device provided in Embodiment 11 may serve as an intermediate node on a physical link between a transmit end and a receive end in a packet-based network. The forwarding device provided in Embodiment 11 may implement functions of the intermediate node in Embodiment 1 to Embodiment 4. The forwarding device provided in Embodiment 11 may further use the state machine provided in Embodiment 6. For specific content, refer to corresponding content in Embodiment 6. The forwarding device provided in Embodiment 11 includes a processor 1501, a memory 1502, a communications bus 1504, and a communications interface 1503. The processor 1501, the memory 1502, and the communications interface 1503 are connected by using the communications bus 1504. The memory 1502 is configured to store a program. The processor 1501 performs, according to an executable instruction included in the program that is read from the memory 1502, the method performed by the intermediate node in any one of Embodiment 1 to Embodiment 4. By using the communications interface 1503, the processor 1501 may receive and send a data packet of one or more traffic flows, and receive and send a control packet corresponding to the data packet.

The units included in the forwarding device provided in Embodiment 11 may perform corresponding functions of the intermediate node provided in any one of Embodiment 1 to Embodiment 4. The communications interface 1503 is configured to support the forwarding device in performing S204, S210, S211, and S202 in Embodiment 1, and/or S406, S415, S416, S402, and S404 in Embodiment 2, and/or S602, S604, and S606 in Embodiment 3, and/or S808, S802, and S804 in Embodiment 4. The processor 1501 is configured to support the forwarding device in implementing S203, S207, and S209 in Embodiment 1, and/or S405, S411, and S414 in Embodiment 2, and/or S605, S609, and S612 in Embodiment 3, and/or S805, S806, S807, S809, S812, and S813 in Embodiment 4.

Embodiment 12

Figure 16:
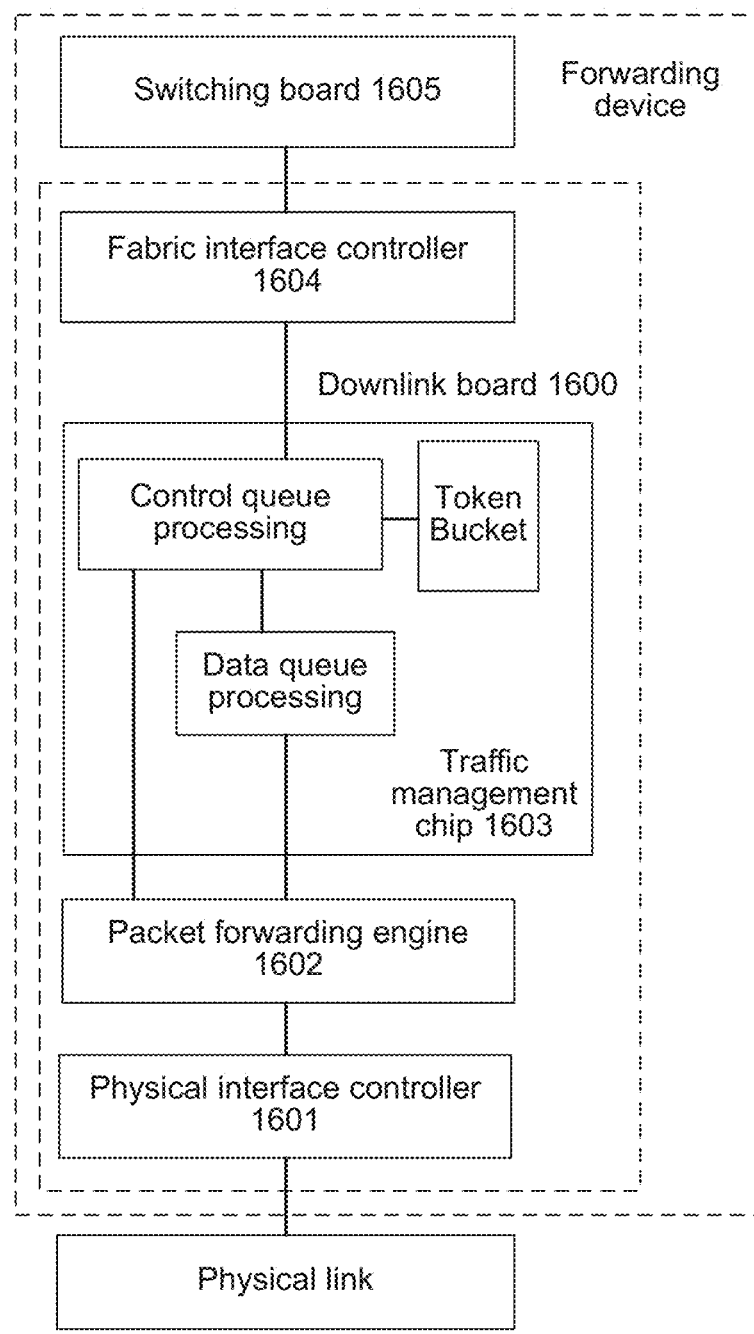
FIG. 16 is a schematic structural diagram of a forwarding device according to Embodiment 12 of this application.

FIG. 16 is a schematic structural diagram of a forwarding device according to Embodiment 12 of this application. A structure of the forwarding device provided in Embodiment 12 is described from the perspective of product hardware implementation. The forwarding device provided in Embodiment 12 may further use the state machine provided in Embodiment 6. For specific content, refer to corresponding content in Embodiment 6. The forwarding device provided in Embodiment 12 includes a switching board 1605 and a downlink board 1600. The downlink board 1600 is configured to process a packet from a user and sent to a network side. The downlink board 1600 includes a fabric interface controller (FIC) 1604, a traffic management (TM) chip 1603, a packet forwarding engine (PFE) 1602, and a physical interface controller (PIC) 1601. The switching board 1605, the fabric interface controller 1604, the packet forwarding engine 1602, and the physical interface controller 1601 support functions of corresponding hardware of a common router. The traffic management chip 1603 can further support a function of the forwarding device in Embodiment 11 on the basis of supporting a function of a traffic management chip included in the common router. The communications interface 1503 included in the forwarding device in Embodiment 11 may be an interface between the traffic management chip 603 and the fabric interface controller 1604 and an interface between the traffic management chip 603 and the packet forwarding engine 1602. The processor 1501 included in the forwarding device in Embodiment 11 may be a processor in the traffic management chip 1603. A token bucket function, a control queue processing function, and a data queue processing function of the traffic management chip 1603 all may be implemented by the processor disposed in the traffic management chip 1603. The memory 1502 included in the forwarding device in Embodiment 11 may be a memory or a storage space that is in the traffic management chip 1603 and that is used to buffer a control queue and a data queue. For specific content of the forwarding device in Embodiment 12, refer to corresponding content in Embodiment 11.

Embodiment 13 of this application provides a system for controlling traffic in a packet-based network. The system includes a source device and an intermediate device. The source device has a function of the source host provided in Embodiment 1, and the intermediate device has a function of the intermediate node provided in Embodiment 1. Alternatively, the source device has a function of the first host or the third host provided in Embodiment 2, and the intermediate device has a function of the intermediate node provided in Embodiment 2. Alternatively, the source device has a function of the first host or the third host provided in Embodiment 3, and the intermediate device has a function of the intermediate node provided in Embodiment 3. Alternatively, the source device has a function of the first host or the third host provided in Embodiment 4, and the intermediate device has a function of the intermediate node provided in Embodiment 4.

Embodiment 14 of this application provides a destination device in a packet-based network. The destination device includes a receiving module, a generation module, and a sending module. The receiving module is configured to receive a first control packet from a source device, where the first control packet includes a parameter set. The generation module is configured to generate a second control packet based on the first control packet, where a source address of the second control packet is a destination address of the first control packet, and a destination address of the second control packet is a source address of the first control packet. The sending module is further configured to send the second control packet to the source device, where the source address of the second control packet is an address of the destination device, and the destination address of the second control packet is an address of the source device. The destination device may be the receive end mentioned in the first aspect, any possible design of the first aspect, the second aspect, or any possible design of the second aspect. When the destination device is the destination host in Embodiment 1, the source device is the source host in Embodiment 1. When the destination device is the second host in any one of Embodiment 2 to Embodiment 4, the source device is the first host in the corresponding embodiment. When the destination device is the fourth host in any one of Embodiment 2 to Embodiment 4, the source device is the third host in the corresponding embodiment.

In the scenarios provided in the embodiments of this application, the token bucket included in the egress port of the intermediate node may be replaced with another scheduler, and a function of the another scheduler is the same as a function of the token bucket. Any host in the embodiments of this application may be a user-side terminal or a user-side network device. The user-side terminal may be a tablet or a computer used by a user. The user-side network device may be a set-top box or a home gateway disposed on a user side.

In the embodiments of this application, for ease of description, "first", "second", "third", and "fourth" are used to distinguish between data queues and control queues on different devices. The scenario shown in FIG. 1 is used as an example. A data queue on S1 may also be referred to as a second data queue, and a control queue on S1 may also be referred to as a second control queue. Correspondingly, a data queue on R2 is referred to as a first data queue, and a control queue on R2 is referred to as a first control queue. In scenarios shown in other accompanying drawings, names of data queues and control queues may be set according to a requirement, and are not limited to the manners provided in the scenarios shown in the accompanying drawings.

In the embodiments of this application, a data channel and a control channel are carried on one or more physical links between the source host (the first host) and the destination host (the second host). If the data channel and the control channel are carried on the one physical link, a sum of a bandwidth of the data channel and a bandwidth of the control channel is a bandwidth of the one physical link, and a ratio of the bandwidth of the data channel to the bandwidth of the control channel is a ratio of a sum of packet lengths of C data packets to a packet length of any control packet. FIG. 11 to FIG. 13 are merely schematic diagrams in which the data channel and the control channel are carried on one physical link. If the data channel and the control channel are respectively carried on two physical links between the source host (the first host) and the destination host (the second host), a ratio of a bandwidth of a physical link carrying the data channel to a bandwidth of a physical link carrying the control channel is the ratio of the sum of the packet lengths of the C data packets to the packet length of the any control packet. The physical link carrying the data channel and the physical link carrying the control channel pass through a same node. Therefore, a link status that is of the physical link carrying the control channel and that is detected by sending a control packet can indirectly reflect a link status of the physical link carrying the data channel.

A general purpose processor mentioned in the embodiments of this application may be a microprocessor or the processor may be any conventional processor. The steps in the methods disclosed with reference to the embodiments of the present invention may be directly performed by using a combination of hardware in the processor and a software module. When it is implemented by using software, code that implements the foregoing functions may be stored in a computer readable medium. The computer readable medium includes a computer storage medium. The storage medium may be any available medium accessible to a computer. The following is used as an example but not a limitation: The computer readable medium may be a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. The computer readable medium may be a compact disc (CD), a laser disc, a digital video disc (DVD), a floppy disk, or a Blu-ray disc.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly. For related parts, refer to partial descriptions in the method embodiment.

What is claimed is:

1. A method for controlling traffic in a packet-based network, comprising:
    obtaining, by a transmit end, a packet header of a first control packet based on a data packet in a first data packet set, wherein the packet header of the first control packet comprises a parameter set;
    generating, by the transmit end, the first control packet based on the packet header and a preset packet length of the first control packet;
    sending, by the transmit end, the first control packet to a receive end through a control channel, wherein the first control packet comprises the parameter set;
    receiving, by the transmit end, a second control packet sent by the receive end, wherein the second control packet comprises the parameter set; and
    after receiving the second control packet, sending, by the transmit end, the first data packet set to the receive end through a data channel, wherein the first data packet set comprises C data packets, C is an integer greater than or equal to 1, and each data packet in the first data packet set comprises the parameter set.

2. The method according to claim 1, wherein after the transmit end receives the second control packet, the method further comprises:
    sending, by the transmit end, a third control packet through the control channel according to an additive-increase/multiplicative-decrease (AIMD) algorithm, wherein the third control packet comprises the parameter set.

3. The method according to claim 2, wherein after sending, by the transmit end, the third control packet through the control channel, the method further comprises:
    receiving, by the transmit end, a fourth control packet sent by the receive end, wherein the fourth control packet comprises the parameter set; and
    after receiving the fourth control packet, sending, by the transmit end, a second data packet set to the receive end through the data channel, wherein the second data packet set is after the first data packet set in a traffic flow to which the first data packet set belongs, the second data packet set comprises C data packets, and each data packet in the second data packet set comprises the parameter set.

4. The method according to claim 1, wherein the first control packet further comprises a round trip time (RTT) and a sequence number, the RTT is a duration from a moment at which the transmit end sends the first control packet to a moment at which the transmit end receives the second control packet, and the sequence number is used to identify the first control packet.

5. The method according to claim 1, wherein a ratio of a sum of the packet lengths of the C data packets to a packet length of the first control packet is a ratio of a bandwidth of the data channel to a bandwidth of the control channel.

6. A non-transitory computer readable storage medium, comprising an instruction, wherein when the instruction is run on a computer, the computer is enabled to perform the method for controlling traffic in a packet-based network according to claim 1.

7. The method according to claim 1, wherein the parameter set includes a 5-tuple or a source address and a destination address.

8. The method according to claim 7, wherein the source address is a source media access control (MAC) address or a source internet protocol (IP) address, and the destination address is a destination MAC address or a destination IP address.

9. The method according to claim 1, wherein the parameter set includes a source address and a destination address corresponding to a fiber channel.

10. A source device in a packet-based network, comprising:
    a processor; and
    a non-transitory computer-readable storage medium coupled to the processor and storing programming instructions for execution by the processor, wherein the programming instructions instruct the processor to:
    obtain a packet header of a first control packet based on a data packet in a first data packet set, wherein the packet header of the first control packet comprises a parameter set;
    generate the first control packet based on the packet header and a preset packet length of the first control packet;
    send the first control packet to a destination device through a control channel, wherein the first control packet comprises the parameter set;
    receive a second control packet sent by the destination device, wherein the second control packet comprises the parameter set; and
    after receiving the second control packet, send the first data packet set to the destination device through a data channel, wherein the first data packet set comprises C data packets, C is an integer greater than or equal to 1, and each data packet in the first data packet set comprises the parameter set.

11. The source device according to claim 10, wherein the programming instructions further instruct the processor to:
    send a third control packet through the control channel according to an additive-increase/multiplicative-decrease (AIMD) algorithm, wherein the third control packet comprises the parameter set.

12. The source device according to claim 11, wherein the programming instructions further instruct the processor to:
    receive a fourth control packet sent by the destination device, wherein the fourth control packet comprises the parameter set; and after receiving the fourth control packet, send a second data packet set to the destination device through the data channel, wherein the second data packet set is after the first data packet set in a traffic flow to which the first data packet set belongs, the second data packet set comprises C data packets, and each data packet in the second data packet set comprises the parameter set.

13. The source device according to claim 10, wherein the first control packet further comprises a round trip time (RTT) and a sequence number, the RTT is a duration from a moment at which the source device sends the first control packet to a moment at which the source device receives the second control packet, and the sequence number is used to identify the first control packet.

14. The source device according to claim 10, wherein a ratio of a sum of the packet lengths of the C data packets to a packet length of the first control packet is a ratio of a bandwidth of the data channel to a bandwidth of the control channel.

15. The source device according to claim 10, wherein the parameter set includes a 5-tuple or a source address and a destination address.

16. The source device according to claim 15, wherein the parameter set includes a source address and a destination address corresponding to a fiber channel.

17. The source device according to claim 10, wherein the parameter set includes a source address and a destination address corresponding to a fiber channel.

* * * * *